(12) United States Patent
Shaheen et al.

(10) Patent No.: US 6,672,540 B1
(45) Date of Patent: Jan. 6, 2004

(54) ACTUATOR FOR AIRCRAFT STABILIZERS WITH A FAILURE RESPONSIVE LOCK CONTROL MECHANISM

(75) Inventors: Milad A. Shaheen, Rancho Santa Margarita, CA (US); Robert V. Dreher, Irvine, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 10/308,527

(22) Filed: Dec. 3, 2002

(51) Int. Cl.⁷ .................................................. B64D 13/38

(52) U.S. Cl. .................... 244/75 R; 244/87; 74/424.82; 74/424.71

(58) Field of Search ............................... 244/75 R, 213, 244/214, 215, 87; 188/134; 192/223.3, 18 R; 74/380, 383, 409, 411, 411.5, 424.71, 424.82

(56) References Cited

U.S. PATENT DOCUMENTS

| | | |
|---|---|---|
| 1,419,058 A | 6/1922 | Klausmeyer |
| 1,858,259 A | 5/1932 | Alfaro |
| 2,381,679 A | 8/1945 | Maxwell |
| 2,758,485 A | 8/1956 | Jahnel |
| 2,875,631 A | 3/1959 | Syring |
| 3,121,544 A | 2/1964 | Alvarez-Calderon |
| 3,269,199 A | 8/1966 | Deehan et al. |
| 3,449,978 A | 6/1969 | Stimpson |
| 3,539,133 A | 11/1970 | Robertson |
| 3,543,598 A | 12/1970 | Lanzenberger |
| 3,582,023 A | 6/1971 | Rosta et al. |
| 3,630,328 A | 12/1971 | Nelson |
| 3,662,550 A | 5/1972 | Lichtfuss |
| 3,766,798 A | 10/1973 | Kusiak |
| 3,790,106 A | 2/1974 | Sweeney et al. |
| 3,802,281 A | 4/1974 | Clarke |
| 3,831,884 A | 8/1974 | Schellin |
| 3,884,127 A | 5/1975 | Simmons |
| 4,149,430 A | 4/1979 | F'Geppert |
| 4,181,276 A | 1/1980 | Kogure et al. |
| 4,432,516 A | 2/1984 | Muscatell |
| 4,459,867 A | 7/1984 | Jones |
| 4,575,027 A | 3/1986 | Cronin |
| 4,676,460 A | 6/1987 | Hagy et al. |
| 4,679,485 A | 7/1987 | Nelson et al. |
| 4,717,097 A | 1/1988 | Sepstrup |
| 4,720,066 A | 1/1988 | Renken et al. |
| 4,722,615 A | 2/1988 | Bailey et al. |
| 4,738,415 A | 4/1988 | Weyer |
| 4,745,815 A | 5/1988 | Klopfenstein |
| 4,779,822 A | 10/1988 | Burandt et al. |
| 4,826,110 A | 5/1989 | Le |
| 4,945,779 A | 8/1990 | Williams |
| 4,962,902 A | 10/1990 | Fortes |
| 4,979,700 A | 12/1990 | Tiedeman et al. |
| 5,058,445 A | 10/1991 | Nilsson |
| 5,178,030 A | 1/1993 | Bousquet |
| 5,394,288 A | 2/1995 | Nishida et al. |
| 5,484,043 A | 1/1996 | Quick et al. |
| 5,538,202 A | 7/1996 | Thornburg |
| 5,722,616 A | 3/1998 | Durand |
| 5,823,471 A | 10/1998 | Dazet |
| 5,884,872 A | 3/1999 | Greenhalgh |
| 5,913,492 A | 6/1999 | Durandeau et al. |
| 5,927,656 A | 7/1999 | Hinkleman |
| 5,944,148 A * | 8/1999 | Bae et al. ................... 188/134 |

(List continued on next page.)

Primary Examiner—Galen L. Barefoot
(74) Attorney, Agent, or Firm—Harness, Dickey & Pierce, P.L.C.

(57) ABSTRACT

A horizontal stabilizer actuator for a winged aircraft which is selectively pivotally controlled by a pilot or operator at a remote location in the aircraft and which has a primary load path responsive to the selective control by the pilot or operator for setting the pivoted position of the stabilizer and which has a secondary load path which is responsive to a failure in the primary load path to be automatically actuated to a condition locking the stabilizer in a fixed position.

42 Claims, 12 Drawing Sheets

U.S. PATENT DOCUMENTS

| | | |
|---|---|---|
| 6,089,503 A | 7/2000 | Volk |
| 6,220,550 B1 | 4/2001 | McKillip, Jr. |
| 6,220,551 B1 | 4/2001 | Saiz |
| 6,224,017 B1 | 5/2001 | Fischer et al. |
| 6,231,012 B1 | 5/2001 | Cacciola et al. |
| 6,276,225 B1 | 8/2001 | Takeda et al. |
| 6,325,331 B1 | 12/2001 | McKeown |
| 6,345,792 B2 | 2/2002 | Bilanin et al. |
| 6,372,695 B2 | 4/2002 | Ushida |
| 6,382,566 B1 | 5/2002 | Ferrel et al. |
| 6,446,911 B1 | 9/2002 | Yount et al. |
| 6,464,176 B2 | 10/2002 | Uchida et al. |
| 6,467,363 B2 | 10/2002 | Manzanares et al. |
| 6,481,305 B2 | 11/2002 | Nishimura et al. |
| 6,484,599 B2 | 11/2002 | Blaurock |
| 6,499,374 B1 | 12/2002 | Ohga |
| 6,508,439 B1 | 1/2003 | Fink et al. |
| 6,513,762 B2 | 2/2003 | Fink et al. |
| 2002/0030138 A1 | 3/2002 | Serven |

\* cited by examiner

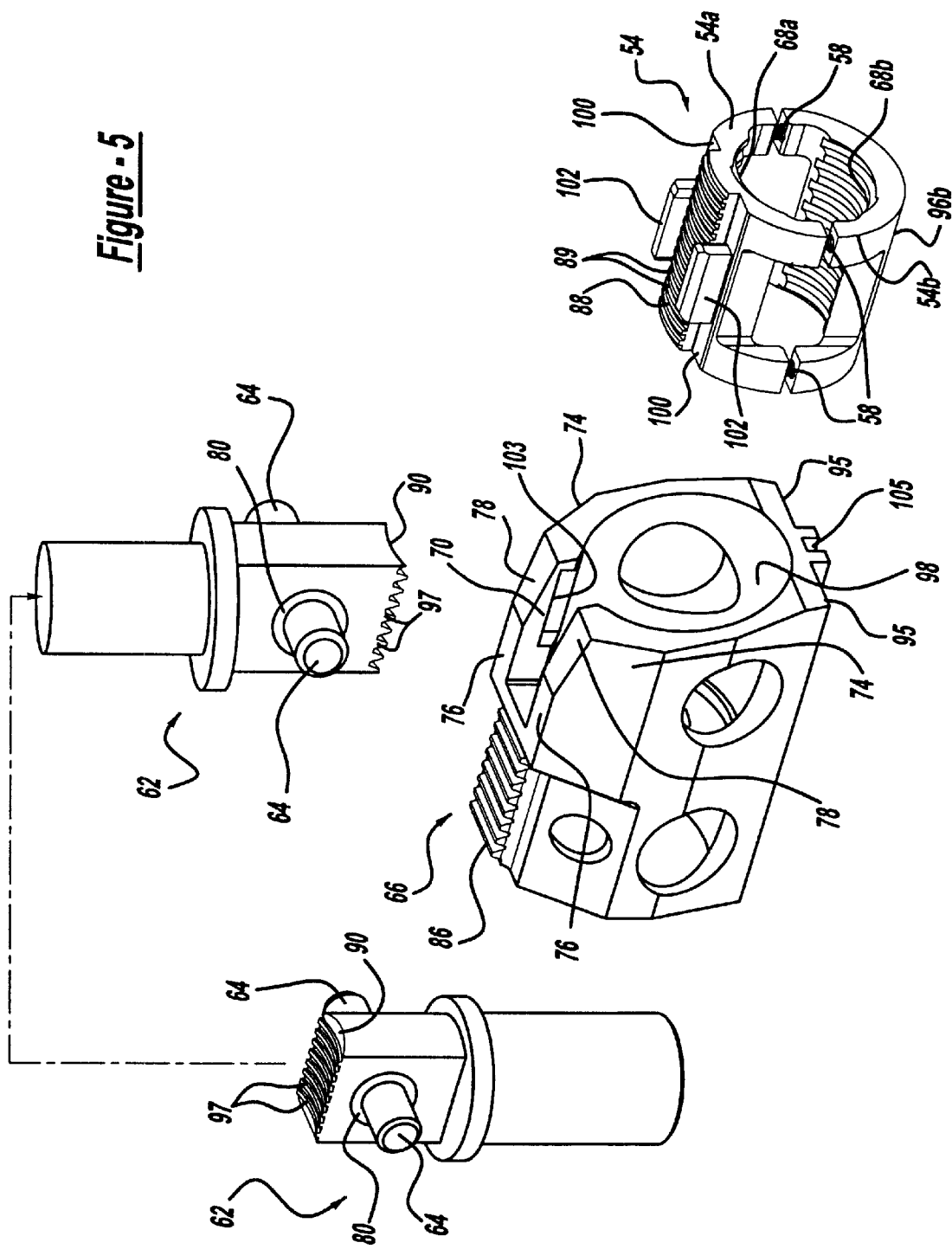

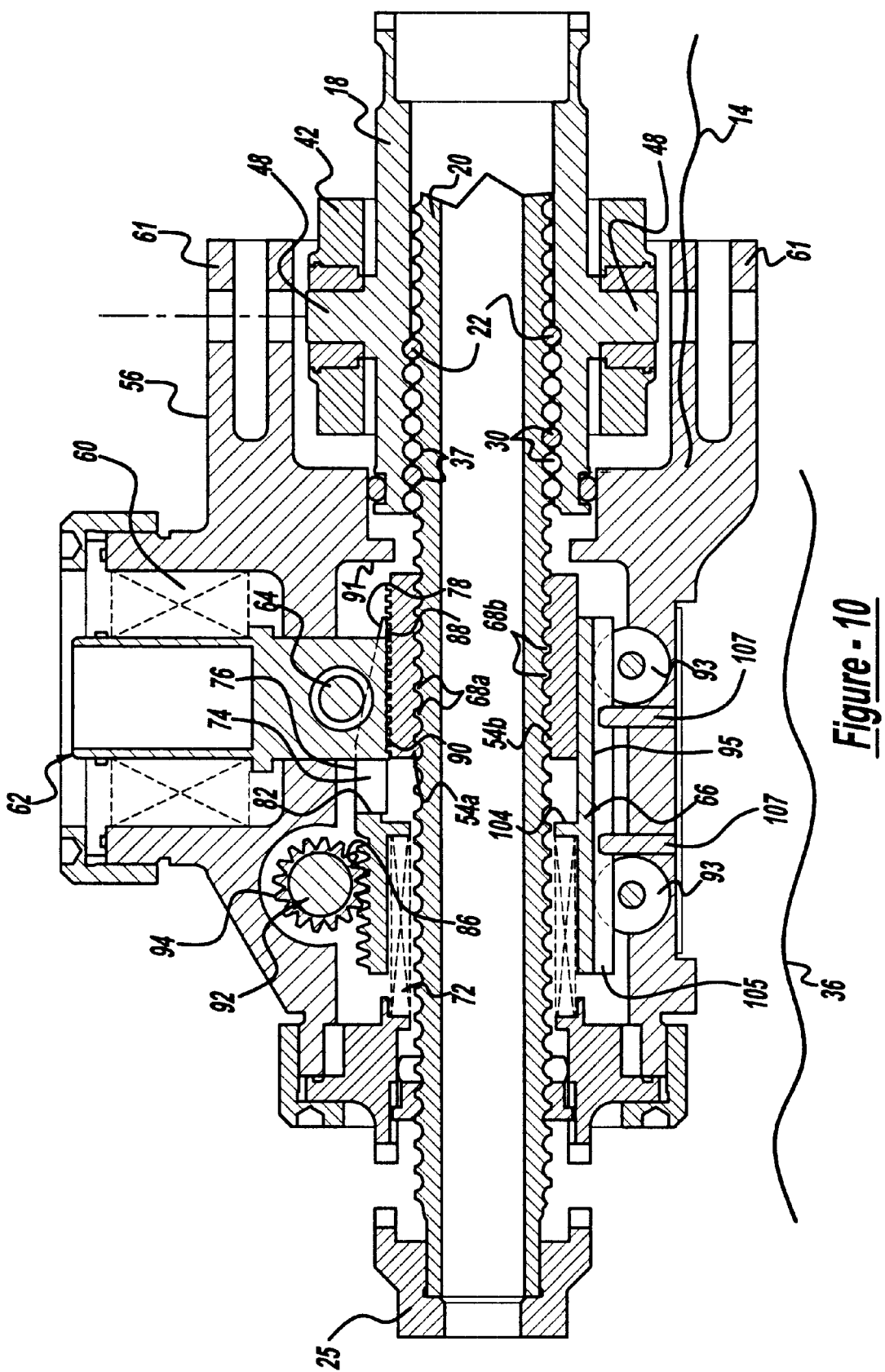

ACTUATOR FOR AIRCRAFT STABILIZERS WITH A FAILURE RESPONSIVE LOCK CONTROL MECHANISM

FIELD OF THE INVENTION

The present invention relates to horizontal stabilizer actuators for selectively controlling the operative position of aircraft stabilizers.

BACKGROUND OF THE INVENTION

Modern aircraft have horizontal stabilizers located at the tail section of the fuselage or the rudder section that are pivotally supported relative to the airplane fuselage to "trim" the aircraft during flight by selective adjustment by the operator or pilot from an internal control unit. This involves adjusting the position of the horizontal stabilizer by a stabilizer actuator to accommodate different load distributions within the aircraft and different atmospheric conditions, i.e. wind, rain, snow, etc. In this regard the stabilizer is traditionally pivotally connected to the rudder section or tail section of the fuselage at a point generally midway along its length. One common trimmable horizontal stabilizer actuator consists of a primary ball nut assembly connected with an actuating drive gimbal which is pivotally connected to one end of the horizontal stabilizer structure. The ball nut assembly includes a ball nut housing and a rotatable ballscrew extending axially and usually vertically through the ball nut housing and a drive gimbal housing. The ball nut housing is connected to the drive gimbal housing by a trunnion segment. The ballscrew, in turn, has its upper end remote from the actuating drive gimbal and is fixed from translation or axial movement by a connection to a second, support gimbal which is pivotally secured to the rudder section or the tail section. As the ballscrew is rotated, the drive gimbal will be moved in translation relative to it. Thus as the ballscrew is rotated in one direction, the leading edge of the horizontal stabilizer is pivoted upward, whereas by rotating the ballscrew in the other direction, the leading edge of the horizontal stabilizer is pivoted downward. Rotation of the ballscrew is routinely done by a motor and associated gearing which is connected to the second, fixed support gimbal and which is actuated by the operator or pilot by the internal control unit. The connection of the stabilizer actuator to the stabilizer is located within the rudder or fuselage tail section and not directly in the air stream.

The horizontal stabilizer movement, as controlled by the operator, is transmitted by the ballscrew through the actuating drive gimbal by way of the primary ball nut assembly which defines a primary load path. The movement has a load with tensile and compressive components as well as a torque component due to the ballscrew thread lead. Failures of the primary load path such as caused by the shearing off of the connecting trunnion segment or by the loss of nut ball members from the ball nut assembly can result in the complete loss of control of the horizontal stabilizer. However, stabilizer actuators have frequently been provided with a secondary load path for alternate control of the stabilizer. In such structures, the primary load path is normally controllably actuated by the operator and is thus under load while the secondary load path is normally unactuated and thus unloaded. In the event of a primary load path failure, the secondary load path is automatically mobilized whereby the stabilizer actuator can continue to be controllably actuated by the operator or pilot by the internal control unit to control the position of the stabilizer. The transition of control to the secondary load path can occur quite rapidly whereby failure of the primary load path is not necessarily detected by the operator or pilot.

However, in the event of a subsequent failure of the secondary load path through continued, periodic use, control of the stabilizer will be completely lost which could result in erratic, oscillatory movement of the stabilizer whereby the ability of the pilot or operator to control the aircraft could be substantially inhibited. This problem is addressed by the present invention.

SUMMARY OF THE INVENTION

In the present invention the stabilizer actuator is also provided with a primary and secondary load path. However, in the event of failure of the primary load path, the secondary load path will be automatically actuated to trigger the actuator to a locked condition to hold the horizontal stabilizer in a fixed position. This avoids erratic movement of the stabilizer and hence permits the pilot to regain control through other mechanisms whereby the continued flight and landing of the aircraft can be more readily controlled. Thus the locking, operation of the secondary load path shall be clearly detected by the pilot or operator during the flight by shutting down the drive system and holding the horizontal stabilizer in a fixed, position. Steps can then be taken to repair or replace the stabilizer actuator prior to the next flight. Also, with the present invention it shall be possible to test the condition of the mechanism for the secondary load path to provide permanent immobilization by a readily accessible in-situ inspection structure of the mechanism during routine maintenance checks at periodic intervals. This is to ensure that the secondary load path mechanism is functional. As will be seen, the apparatus for the secondary load path includes a locking mechanism which operates in response to minimal uncontrolled movement of the stabilizer and minimal triggering loads relative to the operating load in response to a failure of the primary load path. Once it is triggered to a locked condition the locking mechanism stays lockingly engaged regardless of varying aerodynamic loads on the stabilizer and hence on the stabilizer actuator and regardless of attempted control of the stabilizer actuator by the operator through the internal control unit. Thus the stabilizer actuator of the present invention provides:

1) permanent immobilization of the stabilizer actuator via a secondary load path to hold the stabilizer in a fixed position in the event of failure of the mechanism for the primary load path;
2) the ability of the locking mechanism for the secondary load path to achieve permanent, fixed immobilization under minimal aerodynamic triggering loads;
3) the ability of the locking mechanism to keep the stabilizer actuator immobilized even though aerodynamic loads of varying magnitudes are applied to the stabilizer up to the tensile and compressive design load limits;
4) a clear signal to the operator, via the locked condition, by rendering the internal control unit ineffective, that there has been a failure in the primary load path and that repair should be done upon landing; and
5) readily accessible in-situ inspection of the locking mechanism for the secondary load path locking function during scheduled intervals to confirm that the locking mechanism should be able to operate when activated after a primary load path failure.

Therefore it is an object of the present invention to provide an aircraft stabilizer actuator which responds in the event of failure of the primary load path to trigger a secondary load path to lock the stabilizer actuator and stabilizer in a fixed position thus inhibiting erratic, uncontrolled movement of the stabilizer.

It is another object of the present invention to provide an aircraft stabilizer actuator which has a primary load path by which the stabilizer is normally selectively actuated by the operator and a secondary load path which will lock the stabilizer actuator to hold the stabilizer in a fixed position in the event of failure of the structure for the primary load path and further providing a means for ready, routine in-situ ground inspection of the secondary load path locking mechanism to periodically determine its operative or inoperative condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is an exploded, perspective view of a slider, split nut halves of a locking split nut and a locking piston in a disassembled condition and includes a perspective view of the locking piston shown in an inverted position for clarity;

FIG. 10 is a view similar to FIGS. 8 and 9 depicting the secondary load path section being manually actuated to its fully locked condition to immobilize the stabilizer actuator for an in-situ test and check.

DETAILED DESCRIPTION OF THE PREFERRED EMBODIMENT(S)

The following description of the preferred embodiment(s) is merely exemplary in nature and is in no way intended to limit the invention, its application, or uses.

As noted previous designs of stabilizer actuators had a secondary load path section operable by the pilot or operator for controlling the stabilizer in the event of a failure in the primary load path section. These structures relied on an inverted nut with threads in sliding engagement along the rotating ballscrew to provide a secondary load path in the case of failure in the primary load path section such as the shearing off of a connecting trunnion segment of a ball nut housing or the loss of nut ball members from the ball nut assembly. The inverted nut thread sliding against the rotating ballscrew thread does not necessarily generate enough frictional torque to stall and immobilize the horizontal actuator drive system and thus permits continued operation of the stabilizer actuator by the operator from the internal control unit. In addition since the stabilizer actuator was still responsive to the operator, the failure of the primary load path section was not necessarily detected until the next general inspection interval. Also, such previous designs did not provide a structure to allow ready in-situ inspection of the operative condition of the secondary load path section. It should be noted that aircraft also have actuators for air foils, flaps and the like which include control apparatus for providing a braking or locking action in response to overload, component failure and the like. However, such actuators and control apparatus are unlike that of the present invention.

The present invention provides an improved stabilizer actuator with means for braking the stabilizer actuator to immobilize it and shut down the horizontal stabilizer drive system in the event of primary load path failure. Once this is done no further external loads are required to maintain the locked condition. In this regard, once there is a failure in the primary load path, only a relatively small percentage of the aerodynamic load on the stabilizer is required to activate or trigger the secondary load path to its locked condition. At the same time, after triggering the initiation of the locking actuation the uncontrolled movement of the stabilizer is substantially instantly stopped.

Figure 1:
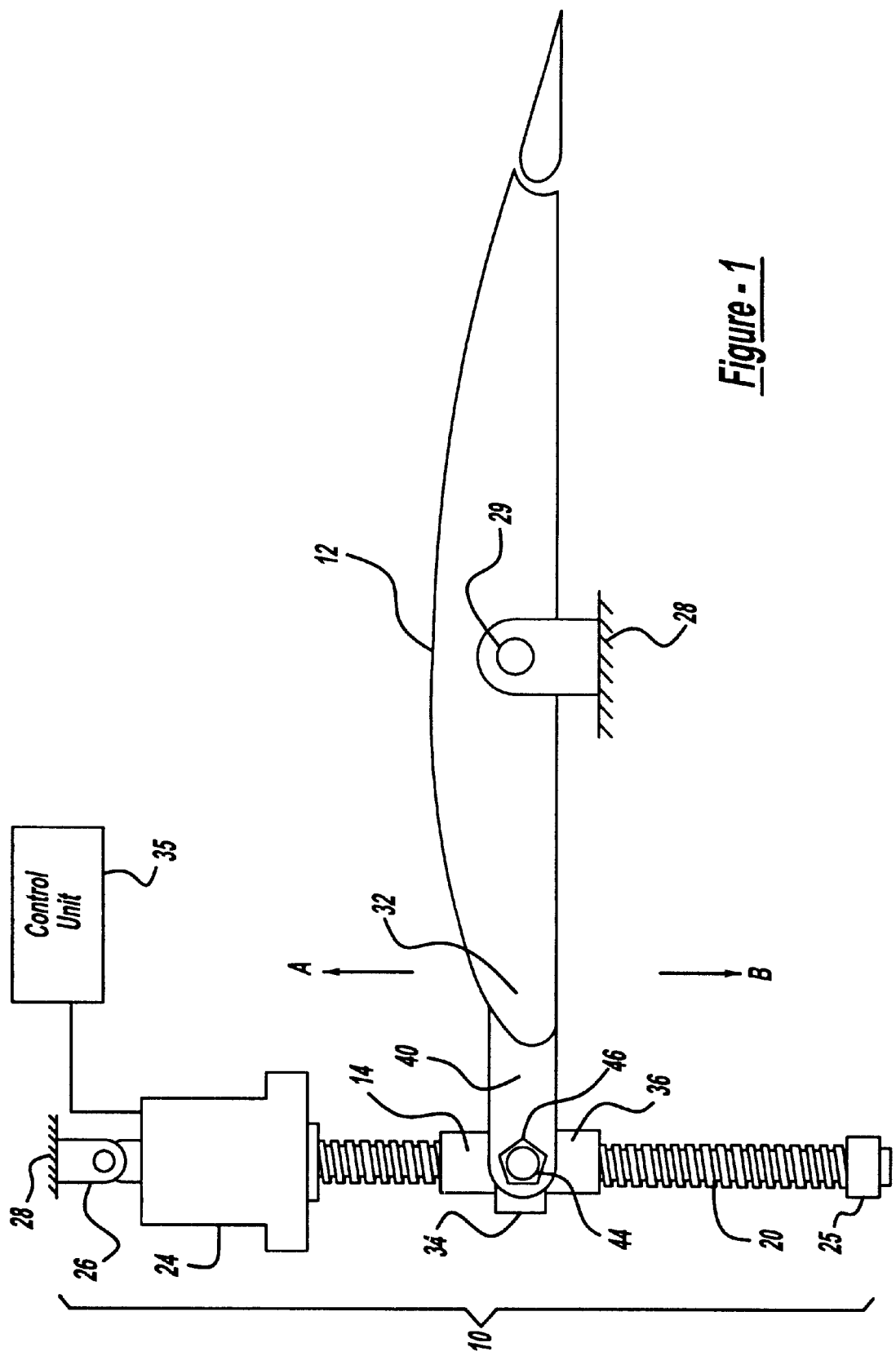
FIG. 1 is a schematic drawing generally depicting the assembly of the stabilizer actuator and the stabilizer relative to an aircraft rudder section or tail section of the fuselage.
Figure 2:
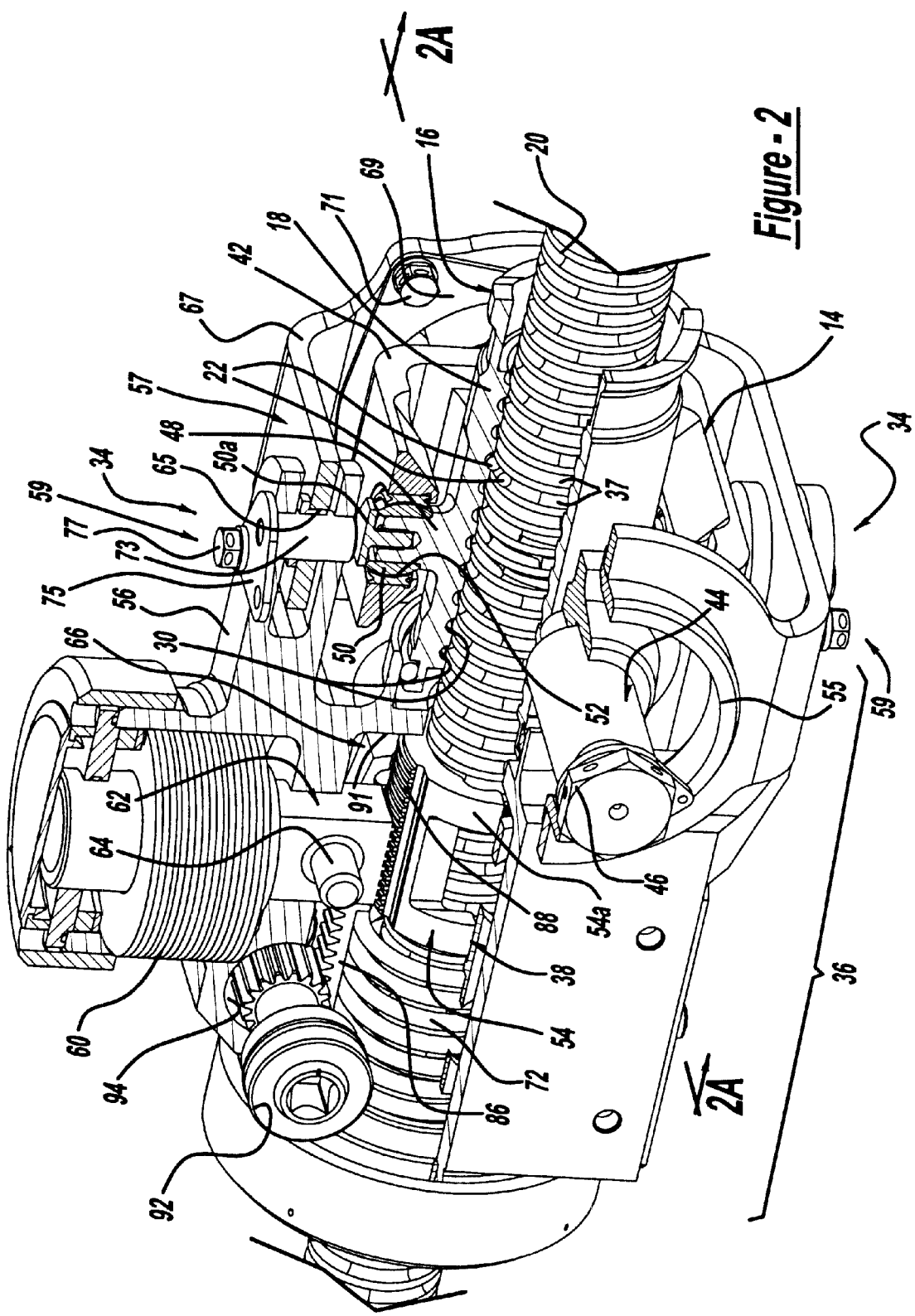
FIG. 2 is a perspective view of the stabilizer actuator including a primary ball nut assembly of a primary load path section and a secondary nut assembly of a secondary load path section with some parts removed and/or broken away for clarity.

Looking now to FIGS. 1 and 2 a stabilizer actuator 10 is shown for selectively controlling the position of a horizontal stabilizer 12. The actuator 10 includes a primary load path section generally indicated by the numeral 14 having a primary ball nut assembly 16. The primary ball nut assembly 16 includes a ball nut housing 18 connected by threads with a ballscrew 20 via a plurality of nut ball members 22. Only a few nut ball members 22 are shown in the drawings. The ballscrew 20 extends generally vertically and is connected at its upper end to a hydraulic or electric drive motor and gear assembly 24. An end cap 25 is fixed to the opposite lower end of the ball screw 20 to assure that the ballscrew 20 will not be unthreaded from the primary ball-nut assembly 16. The drive motor and gear assembly 24 is connected to an upper support gimbal 26 which in turn is pivotally secured at a fixed position to a portion of the rudder section or tail section 28 of the fuselage. The drive motor and gear assembly 24 and the details thereof are of a construction well known in the art and thus it is only generally shown for purposes of simplicity and brevity.

The horizontal stabilizer 12 is pivotally connected along its length by a pivot structure 29 which is fixed to the rudder section or fuselage tail section 28. The forward end 32 of the horizontal stabilizer 12 is in turn pivotally connected to an actuating drive gimbal 34 located generally midway along the ballscrew 20 and which in turn is pivotally connected to the primary ball nut assembly 16 which is secured to the drive gimbal 34. As noted, the connection of stabilizer actuators to the rudder section or fuselage tail section is common and well known and thus details of the rudder or tail section 28 have been omitted for purposes of brevity and simplicity.

In order to selectively set the position of the horizontal stabilizer 12, the pilot through operation of an internal control unit 35 will energize the drive motor and gear assembly 24 to rotate the ballscrew 20 in one direction which will move the primary ball nut assembly 16 and drive gimbal 34 upward along the axially fixed ballscrew 20 to pivot the forward end 32 of the stabilizer 12 upward or to rotate the ballscrew 20 in the opposite direction which will move the primary ball nut assembly 16 and drive gimbal 34 downward along the fixed ballscrew 20 to pivot the forward end 32 downward. As this occurs the stabilizer actuator 10 is pivoted at the fixed support gimbal 26 and pivoted at the movable drive gimbal 34 to accommodate the angular, arcuate displacement of the forward end 32 of the stabilizer 12. As noted apparatus such as an internal control unit 35 are well known in the art and thus details thereof have been omitted for purposes of brevity and simplicity.

Also such basic operative connections as noted above, are well known in existing stabilizer actuator structures. As will be seen, in the present invention, upon failure of the primary load path section 14 a secondary load path section 36 will be actuated to lock the stabilizer 12 in a fixed position. The secondary load path section is generally indicated by the numeral 36 in FIGS. 2–4.

Looking now to FIG. 2, the primary load path section 14 includes the primary ball nut assembly 16 which has the ball nut housing 18 with helically extending, arcuately shaped grooves 30 on its inner surface. A plurality of nut ball members 22 are matingly located in the housing grooves 30. The ballscrew 20 extends through the nut housing 18 and in turn has helically extending, arcuately shaped grooves or threads 37 on its outer surface which are also adapted to matingly receive the nut ball members 22. As noted such basic structures, which are used to transfer loads by relative rotation with reduced friction, are well known in the art and hence the specific details thereof have been omitted for purposes of simplicity and brevity.

Figure 2A:
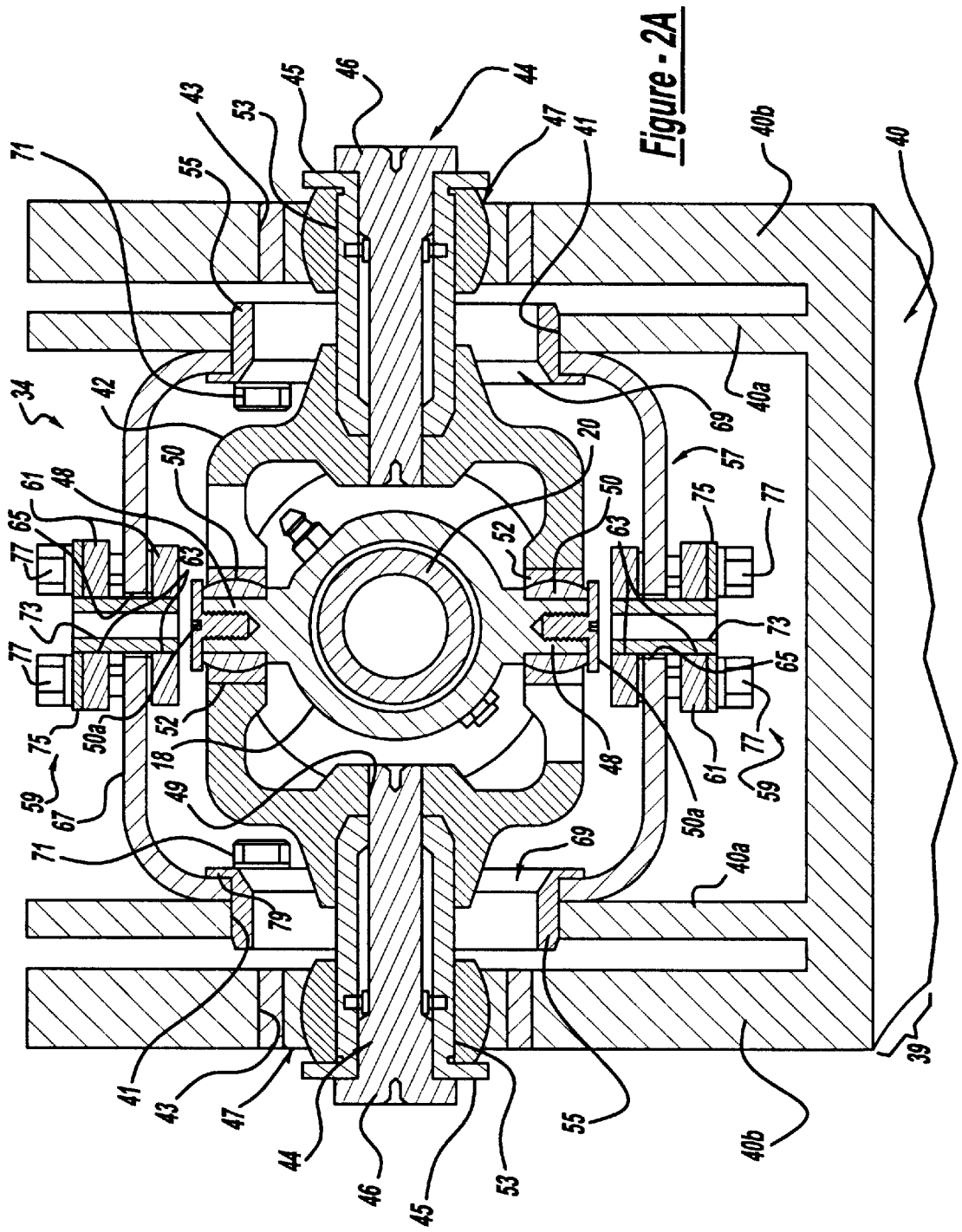
FIG. 2A is a sectional view of the stabilizer actuator of FIG. 2 taken generally in the direction of the Arrows 2A—2A in FIG. 2 with some elements for connection to the stabilizer generally shown in phantom.

The primary load path section 14, includes a primary or drive gimbal housing 42 which has a pair of oppositely extending support rod assemblies 44 each of which includes an outer sleeve 53 and connecting bolt 46. See FIG. 2A. The stabilizer 12 is pivotally connected to the support rod assemblies 44 via a generally U-shaped connecting arm 40. The connecting bolt 46 secures the connecting arm 40 to the support rod assemblies 44 and thereby to the primary gimbal housing 42. As can be seen in FIG. 2A the diametrically opposite sides of the actuating drive gimbal 34 are substantially the same. The nut housing 18 in turn is connected to the primary gimbal housing 42 via a pair of diametrically spaced trunnion segments 48. While only one such trunnion segment 48 is shown in FIG. 2 both are shown in FIG. 2A. Each trunnion segment 48 includes a spherical ball member 50 which is pivotally secured within a partially spherical cavity in a retainer 52 in the primary, drive gimbal housing 42. This pivotal type connection provides a limited amount of movement of the ballscrew 20 and nut housing 18 relative to the primary gimbal housing 42 to accommodate various loads and positions of the stabilizer 12. The spherical ball members 50 are axially held in place by T shaped bolts 50a which are threadably connected to threaded bores in the trunnion segments 48.

Thus, as noted, as the ballscrew 20 is rotated, the primary ball nut assembly 16, which is fixed from rotation, along with the primary, gimbal housing 42 will be moved axially in translation along the ballscrew 20 to thereby pivot the horizontal stabilizer 12 about its pivot structure 29. This structure of the primary load section 14 then provides the primary load path for actuation of the stabilizer 12 as controlled by the operator.

A secondary load path is provided by the secondary load path section 36. The secondary load path section 36 includes a secondary housing assembly which includes a secondary nut housing 56 which is connected to a secondary gimbal ring housing 57. It can be seen that the apparatus for the primary load path section 14 is located generally within the secondary gimbal ring housing 57. The secondary gimbal ring housing 57 includes a main secondary housing section 67 and secondary gimbal pivot connectors 69 which are secured together by threaded fasteners 71.

The secondary gimbal ring housing 57 is pivotally connected to the connecting arm 40 from the stabilizer 12 via a pair of diametrically oppositely located annular gimbal rings 55 extending from ring flanges 79 on each of the pivot connectors 69. The fasteners 71 secure the pivot connectors 69 to the inside of the main secondary housing section 67 through the ring flanges 79. It can be readily seen that this connection then will maintain the secondary load path section 36 pivotally connected to the stabilizer 12 via the connecting arm 40 even in the event of failure of the primary load path section 14, to be described. It can be seen then that this structure in the secondary load path section 36 defines a connecting gimbal structure separate from the drive gimbal 34.

Looking now to FIG. 2A, the U-shaped connecting arm 40 includes two pairs of spaced inner and outer plates 40a and 40b, respectively. The generally U-shaped configuration of the connecting arm 40 is defined by the connection of both pairs of plates 40a and 40b as generally shown at connection 39. The inner plates 40a are provided with large diameter through bores 41 while the outer plates 40b are provided with smaller diameter through bores 43. Spherical bearings 47 are located in the bores 43 in the outer plates 40b. The annular rings 55 of the pivot connectors 69 are rotatably supported in the large diameter bores 41 while the support rod assemblies 44 are rotatably supported in the spherical bearings 47 by engagement with the sleeves 53. To assemble the gimbal pivot connectors 69 and hence the main secondary housing section 67 to the U-shaped connecting arm 40, the fasteners 71 are removed such that the pivot connectors 69 can be located inwardly with the rings 55 in clearance with the inner surfaces of the inner plates 40b of U-shaped connecting arm 40. At the same time the support rod assembles 44 are not yet assembled to the drive gimbal housing 42. Now the main secondary housing section 67 can be moved into the opening of the U-shaped connecting arm 40 and the gimbal pivot connectors 69 can be secured by the fasteners 71 with the gimbal rings 55 located in the bores 41. Next the support rod assemblies 44 can be extended through bearings 47 in the outer plates 40b with the connecting bolt 46 threaded into a bore 49 in the primary gimbal housing 42. Here the sleeve 53 is supported in the bearing 47 and extends into a counterbore 51 adjacent the threaded bore 49. At the same time flanges 45 at the outer end of the sleeves 53 are adapted to overengage the outer ends of the spherical bearings 47 to assist in maintaining them in the bores 43. This then connects the secondary load path via the secondary housing section 67 and the primary load path via the primary gimbal housing 42 to the stabilizer 12. It should be noted that since the connection of the gimbal rings 55 and support rod assemblies 44 with the U-shaped connecting arm 40 is well within the purview of one skilled in the art the details are somewhat generally shown for purposes of brevity and simplicity.

Figure 3:
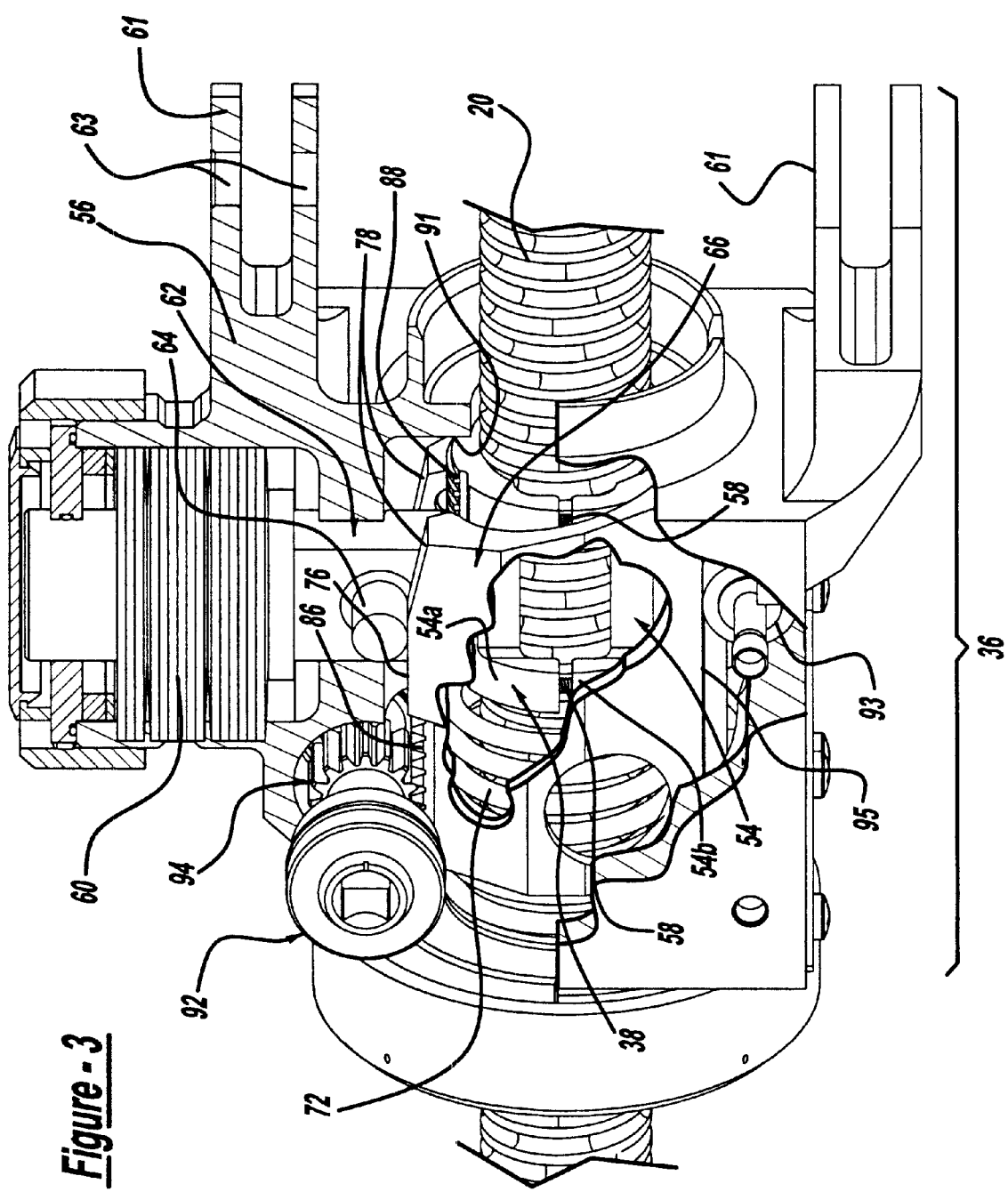
FIG. 3 is a view similar to FIG. 2 depicting the secondary nut assembly of the stabilizer actuator in a set, unlocked condition with the primary load path section removed for clarity.

Looking now to FIGS. 2 and 3, the secondary nut housing 56 is connected to the secondary gimbal ring housing 57 by a pair of diametrically opposite pivot pin assemblies 59. The pivot pin assemblies 59 include a cylindrical pivot pin 73 which is held in place by a plate 75 which is secured to the secondary nut housing by a pair of bolts 77 (only one shown in FIG. 2—see FIG. 2A). The secondary nut housing 56 has a pair of diametrically spaced U-shaped clevis structures 61 each of which has a pair of spaced through bores 63. The inner end of the main secondary housing section 67 of the secondary gimbal ring housing 57 is located within the clevis structures 61 and has spaced bores 65 each of which is located between and in line with a pair of through bores 63. Now the pivot pins 73 extend through the aligned bores 63 and 65 with a tight fit in bores 63 to thereby hold the gimbal ring housing 57 and the secondary nut housing 56 together. In this regard it can be seen that this connection permits a limited amount of relative pivotal and diametrical movement between the housings 56 and 57 to facilitate alignment of the interconnected elements of the primary load path section 14 and the secondary load path section 36.

Figure 4:
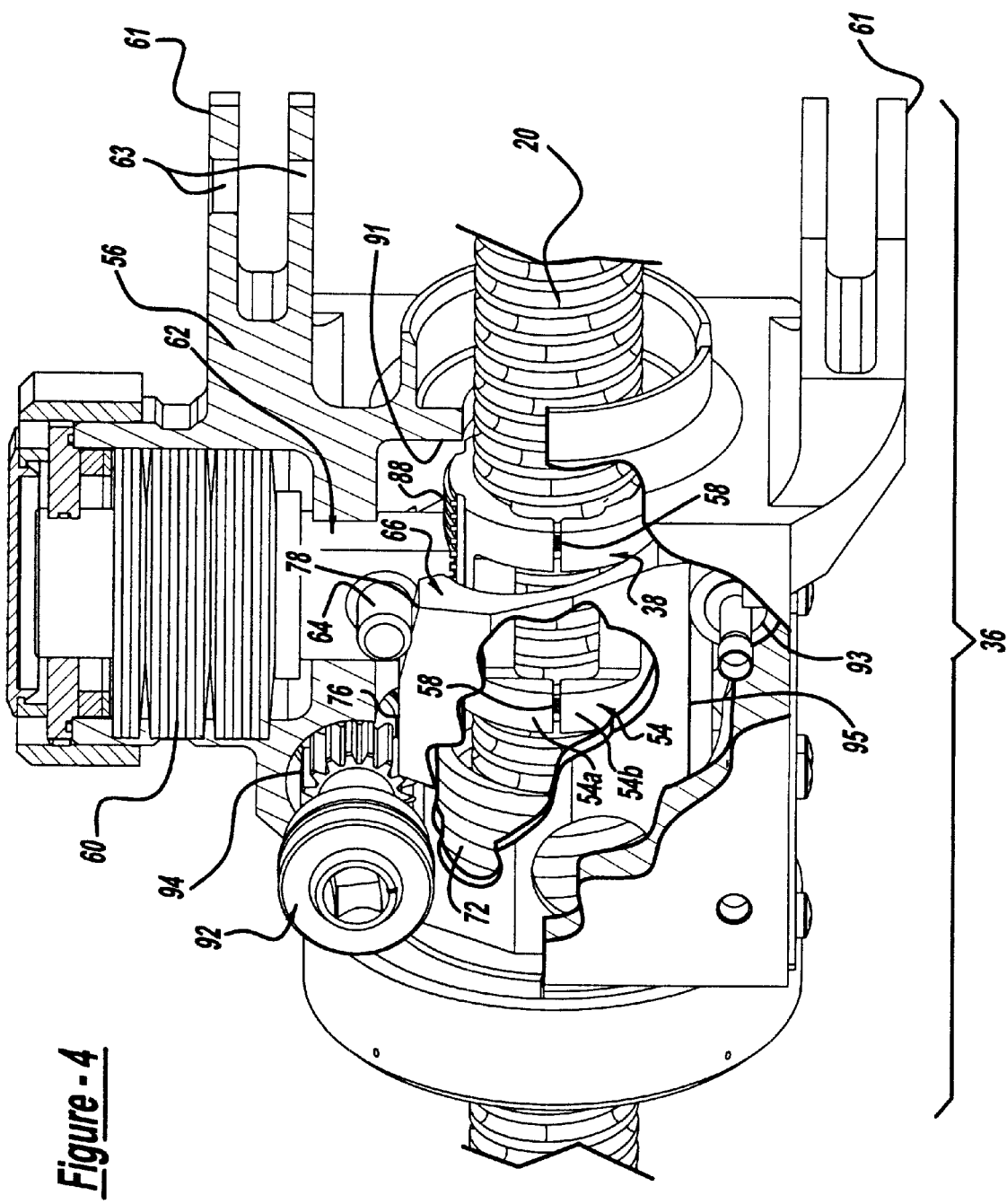
FIG. 4 is a view similar to FIG. 3 depicting the secondary load path section with the secondary nut assembly of the stabilizer actuator triggered to a locked condition for holding the stabilizer actuator locked.

Looking now to FIGS. 2–4, the secondary load path section 36 includes a secondary nut assembly 38 which is operably supported in the secondary nut housing 56. The secondary nut assembly 38 includes a locking split nut 54 located in the secondary nut housing 56. The split nut 54 has generally semi-circular, upper and lower nut halves 54a and 54b, respectively, which are normally biased apart by two pairs of compression springs 58. In one form of the invention, the split nut halves 54a and 54b were made of a lightweight, high strength titanium alloy such as Ti-6Al-4V. At the same time the ballscrew 20 is made of an even higher strength steel alloy such as an induction hardenable stainless steel.

The split nut 54 can be actuated to be forced against the ballscrew 20 by application of a radial force generated by a spring 60 acting on a lock actuating piston 62 supported in the secondary nut housing 56. Locking of the stabilizer 12 is achieved by the clamping of the split nut 54 against the ballscrew 20. The split nut 54 is provided with helically extending, arcuately and helically shaped segments of threads 68a and 68b on the split nut halves 54a and 54b, respectively, adapted to matingly engage the ballscrew threads 37 with some interference. See FIGS. 5 and 5a. The split nut threads 68a and 68b are of a form which is selected such that the frictional engagement between the inverted nut threads 68a and 68b of the split nut 54 and the ballscrew threads 37 provides the necessary braking required to stall the horizontal stabilizer actuator 10. The arcuate form of the threads 68a and 68b on the split nut halves 54a and 54b are contoured such as to provide initial limited surface engagement with the ballscrew threads 37 at an angle of around 45°. As the engagement force on the split nut halves 54a and 54b increases, the split nut threads 68a and 68b will resiliently deform slightly to increase the engagement area with the ballscrew threads 37. At the same time this limited engagement area provides a high magnitude of frictional engagement to enhance the braking action to resist and inhibit rotation of the ballscrew 20 when actuated to the locked condition. In this regard the number of threads 68a and 68b is selected to provide a sufficient number to optimize the engaged surface area to provide the needed strength and frictional resistance. For example around seven such threads 68a and 68b are shown in the drawings.

Figure 5A:
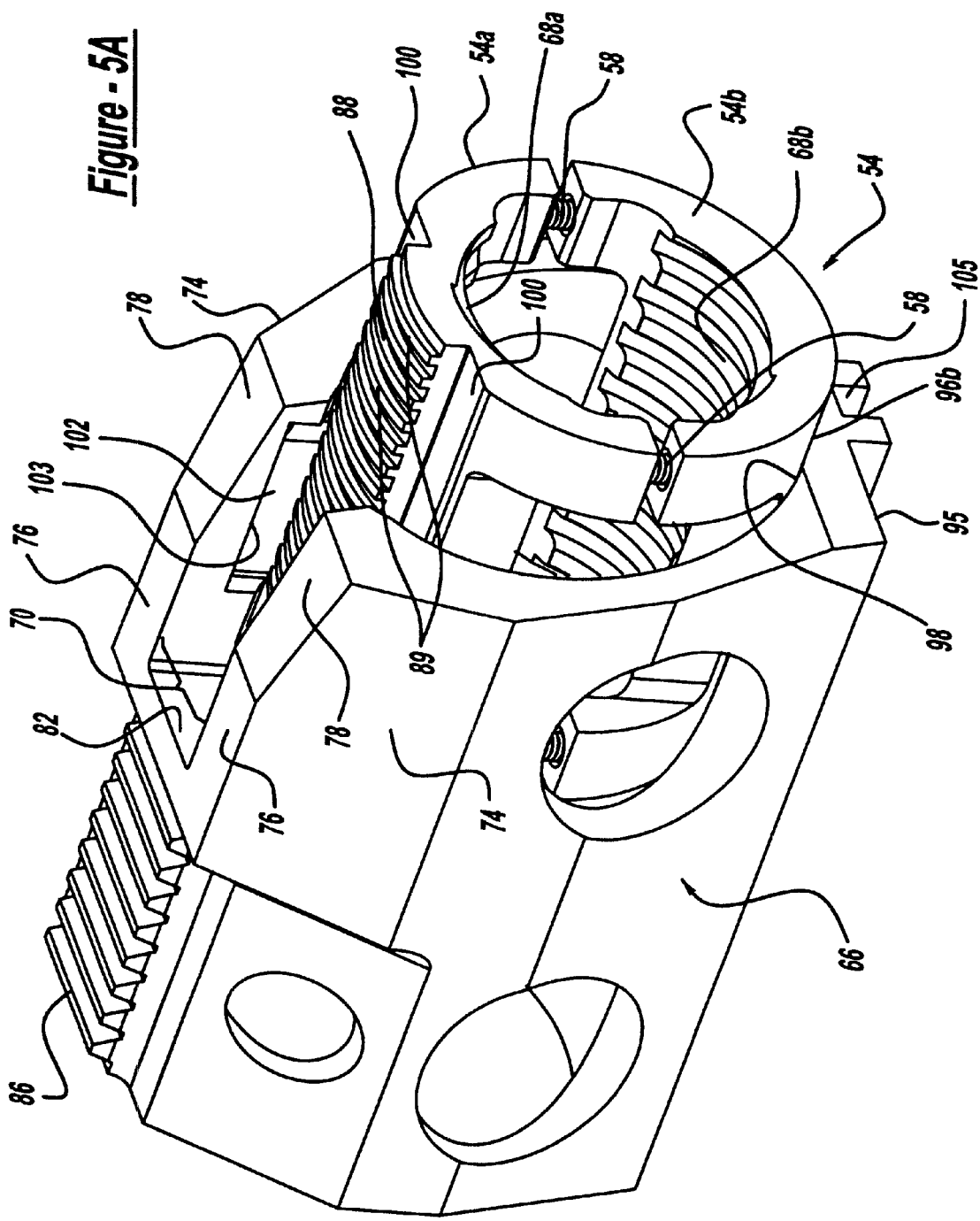
FIG. 5A is an enlarged fragmentary, perspective view of the locking split nut in a partially assembled relationship with the slider.
Figure 6:
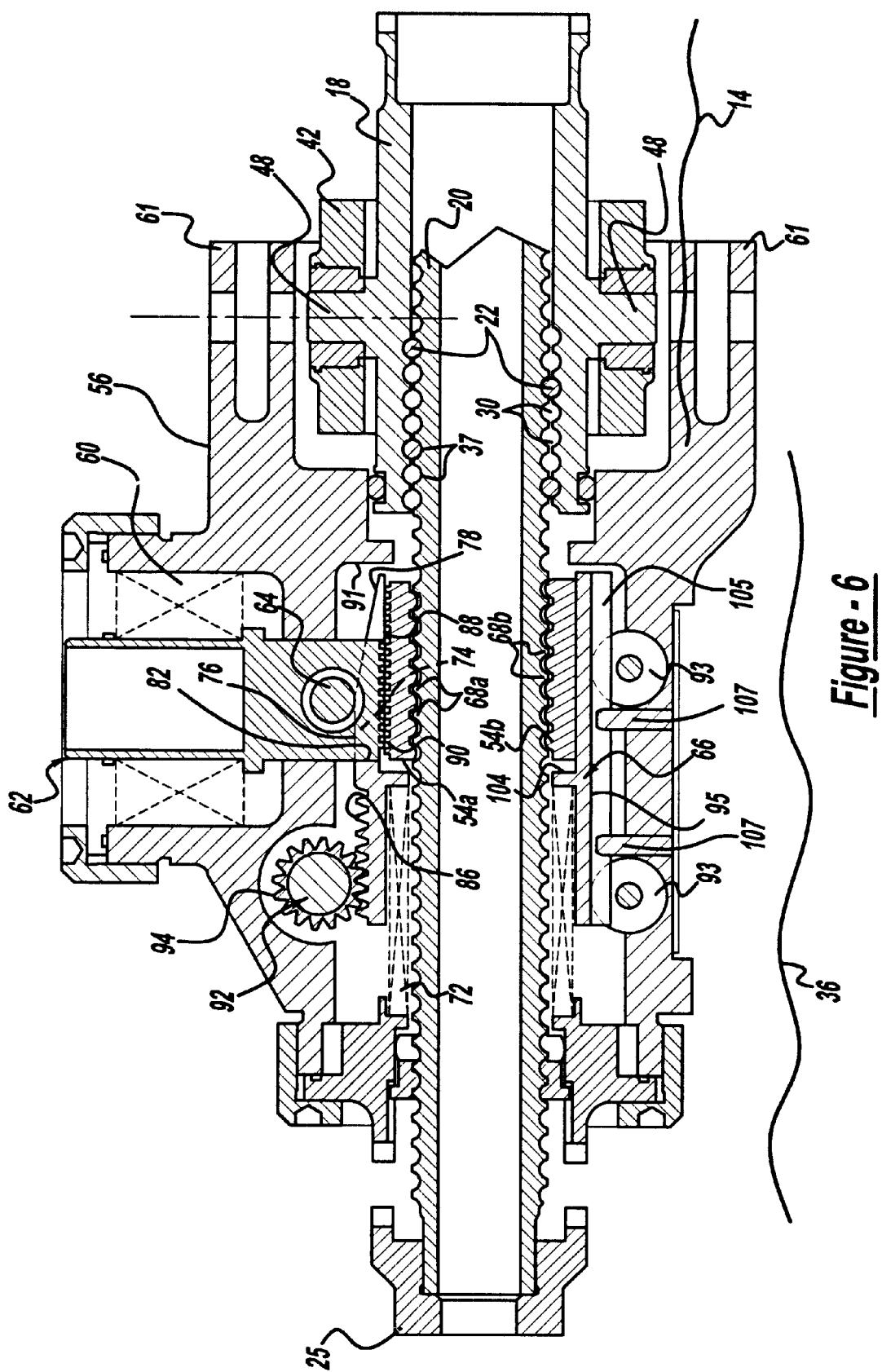
FIG. 6 is a longitudinal sectional view of the primary and secondary nut assemblies of the stabilizer actuator with the primary load path in its normally operative condition and with the secondary load path in its set, unlocked condition.
Figure 8:
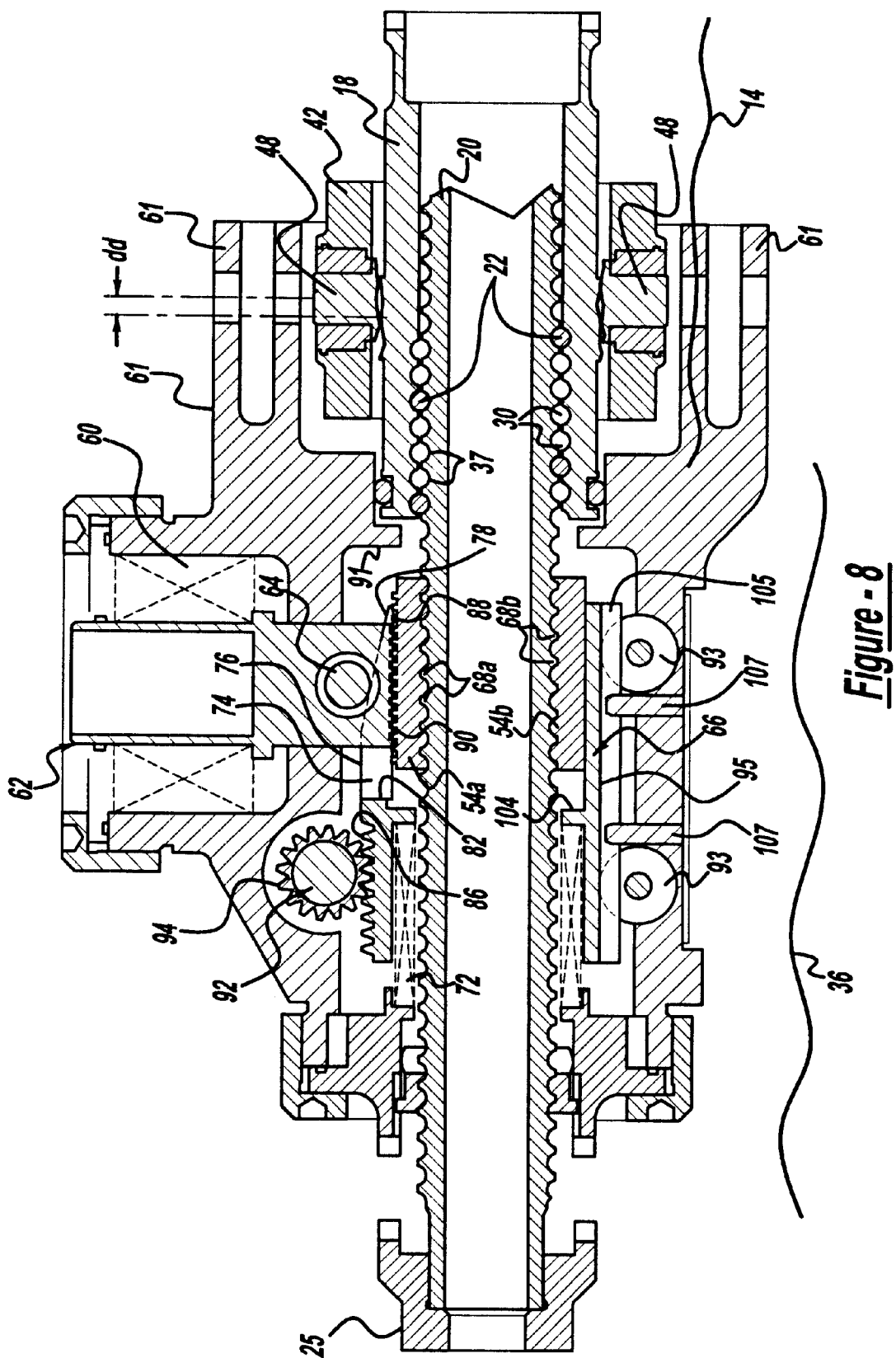
FIG. 8 is a view similar to FIG. 7 depicting the secondary load path section being moved to its fully locked, triggered condition immobilizing the stabilizer actuator.

Looking now to FIGS. 2–4, the piston 62 which is load biased by the spring 60 is normally held away from the split nut 54 by a split nut retainer, slider 66. As best seen in FIGS. 5 and 5a, the slider 66 is generally cylindrical with a slotted, radially U-shaped open section 70 at one end which has a pair of parallel, spaced walls 74. The piston 62 has a transversely extending piston roller 64 with portions extending from each side of the piston 62 which are adapted to engage the upper surfaces of the walls 74. The piston roller 64 is rotatably supported on a needle bearing structure 80 located within the piston 62. Each of the upper surfaces of slider 66 has a substantially straight axially extending hold-off section 76 at one axial end and a downwardly inclined ramp section 78 at its opposite end. The end of the slider 66 opposite from the slotted, open section 70 is closed and has an upper, generally flat axially extending surface provided with gear teeth defining a gear rack 86 which serves a purpose to be described. It can be seen then from FIGS. 3 and 6 that the bottom end of the piston 62 is normally located partially in the slotted, open section 70 in a fixed position spaced from the upper nut half 54a. Upon actuation in response to failure of the primary load path the bottom end of the piston 62 will be moved further into the slotted, open section 70 into compressive engagement with the upper nut half 54a as shown in FIGS. 4 and 8.

The upper surface 88 of the upper nut half 54a is arcuately formed with a plurality of arcuate transverse grooves 89 while the lower surface 90 of the piston 62, which is adapted to engage the upper surface 88, is similarly arcuately formed with mating arcuate transverse grooves 97. Thus upon movement of the piston 62 into engagement with the upper nut half 54a the engagement of the transversely grooved surfaces 88 and 90 will lock the piston 62 with the split nut 54. In this regard, the formation of the grooves 89 and 97 to be arcuate assures full engagement even in the event there is some, even slight, circumferential rotation between the two. Whereas planar grooves would not necessarily compensate for such rotation and have full engagement. The nut retainer, slider 66 is normally held in the "SET" position by a coil spring 72 acting inside the slider 66 to resiliently bias it to a set position with an inner wall 82 against one side of piston 62. See FIG. 6. With the slider 66 in this position, the force of piston 62 is applied only to the slider 66 by the engagement of the piston roller 64 on the straight sections 76 which holds the piston 62 out of engagement with the split nut 54. The slider 66 is movably supported on rollers 93 located within the secondary nut housing 56 and in engagement with flat shoulders 95 on the side of the slider 66 opposite from the slotted open section 70. At the same time the slider 66 has an axially extending guide channel 105 extending, centrally between the flat shoulders 95. A pair of locator pins 107 are connected to the secondary nut housing 56 and extend partially into the guide channel 105 to assist in maintaining the slider 66 aligned within the secondary nut housing 56. See FIGS. 6–10.

Prior to energization, the split nut halves 54a, 54b are held apart from the ballscrew threads 37 by the compression springs 58 to eliminate or reduce frictional drag loads during normal operation. In this regard the crests or peaks of the threads 68a and 68b on the split nut halves 54a, 54b will be located partially within the grooves of the ballscrew threads 37 but with general, axial and radial clearance between the overlapping portions of the confronting crests. Also there is a relatively low drag load on the ballscrew 20 by the split nut 54 from grease like lubricants prior to engagement due to the use of the separating springs 58 that hold the split nut halves 54a and 54b away from direct engagement with the ballscrew 20. However, the partial overlapping engagement of the threads 68a, 68b on nut halves 54a, 54b with the threads on ballscrew 20 provides initial alignment to assure that the threads 68a, 68b are in alignment with the threads of the ballscrew 20 upon locking actuation. The energizing force of spring 60 can be generated by belleville springs, as shown in the drawings, or coil springs depending on the available envelope, permissible weight and actuating force requirements.

As best seen in FIGS. 5 and 5a, the split nut 54 is supported within the cavity of the slider 66 generally in line with the slotted, open section 70. Here the lower, outer surface 96b of the lower split nut half 54b is rounded and is engaged with a similarly rounded lower surface 98 in the cavity of the slider 66 for relative sliding motion. The upper split nut half 54a is provided with a pair of flat shoulders 100. A pair of rectangularly shaped separate keys 102 are oppositely supported in cavities or milled slots 103 in the spaced walls 74 in the open section 70 and extend into the cavity of the slider 66 for sliding engagement with the flat shoulders 100 to maintain the upper nut half 54a at a preselected position for clearance between the transversely grooved surface 88 with the matching transversely grooved lower surface 90 of the locking piston 62. In this regard, the compression springs 58 radially bias the split nut halves 54a and 54b away from each with the rounded lower surfaces 96b and 98 into engagement and with the flat shoulders 100 in engagement with the keys 102.

Locking of the secondary nut assembly 38 is triggered by axial motion of the secondary nut housing 56 relative to the ballscrew 20 which is held fixed by the upper support gimbal 26. This is caused by the uncontrolled, translational movement of the stabilizer 12 upwardly in the direction of the Arrow A in FIG. 1. Also see FIGS. 4 and 7. This motion is caused by failure in the primary load path section 14 such as by the shearing off of the trunnion segments 48 of the nut housing 18 or by the loss of nut ball members 22 from the primary ball nut assembly 16. It also will be caused by a failure at the connection of the support rod assemblies 44 between the primary gimbal housing 42 and the outer plates 40b of the connecting arm 40. When this axial motion occurs, the secondary nut housing 56 moves axially relative to the secondary split nut 54. The secondary split nut 54, however, cannot move axially due to the partial, overlapping engagement of its threads with the threads of the ballscrew 20. The secondary nut assembly 38 is then triggered by relative motion of the nut housing 56 relative to the split nut 54 and ballscrew 20. When this occurs a wall 104 at the inner end of the open section 70 of the slider 66 will be moved into engagement with the split nut 54. See FIGS. 6 and 7. This will then hold the slider 66 in a fixed position against the split nut 54. Now as the nut housing 56 continues in its upward movement relative to the fixed slider 66, the piston roller 64 will then roll from the straight sections 76 onto the inclined ramp sections 78 on the slider 66, forcing the slider 66 away from the piston 62 against the bias of spring 72 whereby the radial force of the piston 62 created by the spring 60 will then act directly on the split nut 54. This will then bring the arcuate, transverse grooves 97 of the surface 90 of the piston 62 into mating engagement with the arcuate, transverse grooves 89 of the surface 88 on the upper nut half 54a. In this regard, the engagement of the piston roller 64 with the inclined ramp sections 78 creates a cam like force sufficient to fully overcome the bias of the coil spring 72 acting on the slider 66. While the lower nut half 54b is substantially fixed, the force of spring 60 on the housing 56 will move the housing 56 and ballscrew 20 radially and bring the lower nut half 54b along with the upper nut half 54a into tight engagement with ballscrew 20. Thus the force is applied to both halves 54a and 54b of the split nut 54 relative to the ballscrew 20 with the arrangement shown. The halves 54a and 54b of the split nut 54 are forced against the ballscrew 20 with enough frictional engagement to prevent the ballscrew 20 from rotation, up to a torque which is higher than that torque which can be applied by the drive motor and gear assembly 24. The friction generated by locking the split nut 54 onto the ballscrew 20 immobilizes the actuator 10. Once the split nut 54 locks around the ballscrew 20, the actuator 10 will remain locked even under load reversal on the stabilizer 12 in the direction of the Arrow B of FIG. 1. The actuated split nut 54 as energized by the spring 60 against the piston 62 provides constant braking to stall and immobilize the stabilizer actuator 10 in the case of failure of the primary load path section 14. As noted the bias on the piston 62 and the angle of inclination of the inclined ramp sections 78 are selected to facilitate rapid locking actuation once the piston roller 64 is moved from the straight sections 76 onto the inclined ramp sections 78.

As noted the locking action described is initiated by the uncontrolled movement of the stabilizer 12 upwardly in the direction of the Arrow A. Movement of the stabilizer 12 in the direction shown by the Arrow B will not trigger the secondary load path section 36 to the locked condition. However, in such event the split nut 54 will be moved into engagement with the annular inner wall 91 in the nut housing 56 to stop the motion of the stabilizer in that direction. When the aerodynamic load reverses on the stabilizer 12, the stabilizer 12 in its uncontrolled, oscillatory movement will move oppositely in the direction of the Arrow A whereby the locking action of the secondary load path section 36 will be triggered as noted. Thus it can be seen that the split nut 54 acts both as a failure sensor and also as a locking structure.

The sequence of operations described with reference to FIGS. 1–5 are shown in schematic form in FIGS. 6–9. Looking now to FIG. 6, the actuating drive gimbal 34 is shown with the primary load pivot section 14 in its normally operative condition and with the secondary load path section 36 in its set, unlocked condition. This is the condition of drive gimbal 34 as shown in FIG. 1 with the secondary gimbal ring housing 57 removed. It can be seen then that the threads 68a and 68b of split nut halves 54a and 54b are held out of direct engagement with the threads 37 of the ballscrew 20. Here the piston roller 64 is held in engagement with the straight sections 76 of the upper surface of walls 74 on the slider 66 with the force of spring 60 on the piston 62.

Figure 7:
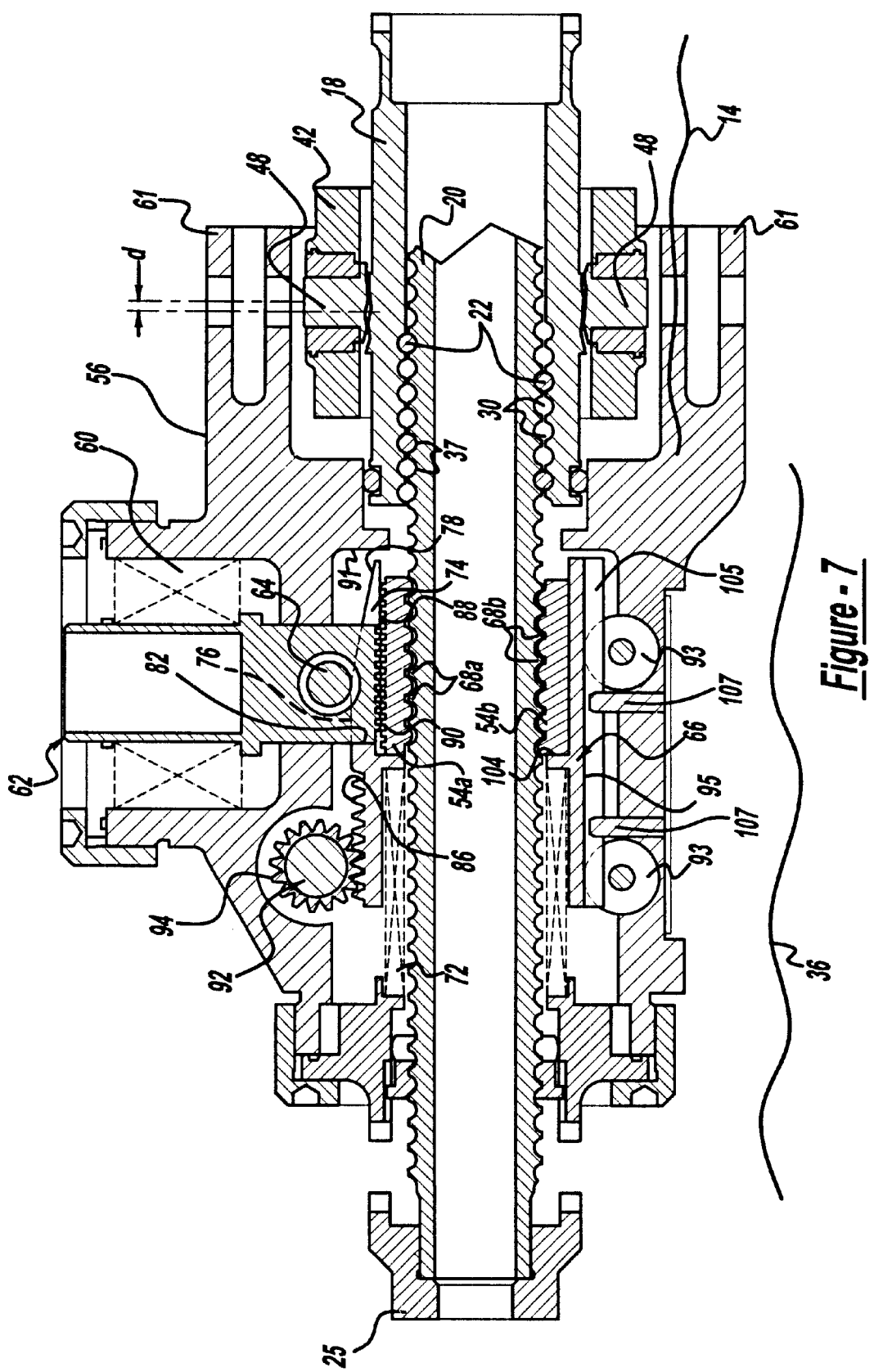
FIG. 7 is a view similar to FIG. 6 depicting the secondary load path section in its initial, triggered condition upon loss of the primary load path section by a failure of the trunnion segment in a ball nut housing in the primary load path section.

The drawing of FIG. 7 next shows the initial condition of the drive gimbal 34 with failure of the segments of the trunnion structure 48 in the primary, ball nut housing 18. Now the slider 66 moves relative to the split nut 54 which is held in place by the light engagement of the flanks of threads 37 of the ballscrew 20 with the flanks of the split nut threads 68a and 68b. This brings the inner wall 104 of slider 66 into engagement with the split nut 54. This occurs by the relative movement of the primary gimbal housing 42 and secondary nut housing 56 relative to the fixed ballscrew 20. This initial travel is indicated by "d" in FIG. 7. It should be noted that the details of the trunnion segments 48 are shown in FIGS. 2 and 2A and such details have been omitted from FIGS. 6–10 for purposes of simplicity. Also while FIGS. 7 and 8 depict the condition of the primary load path section 14 and secondary load path section 36 with the failure of the primary load path section 14 being at one or both of the trunnion segments 48, such trunnion failure could be of various forms such as failure of a spherical ball member 50, shearing of a trunnion segment 48 from the primary gimbal housing 42 or other forms. In this regard, a failure caused at the connection of the support rod assemblies 44 as previously described will be similar. Thus the activation of the secondary load path section 36 will be essentially the same as shown in FIGS. 7 and 8.

Looking now to FIG. 8, as the relative movement of the primary gimbal housing 42 and secondary nut housing 56 relative to the ballscrew 20 continues the slider 66 is moved against the spring 72 whereby the ramp sections 78 on the slider 66 will be moved into engagement with the piston roller 64. This will then cam the slider 66 further against the bias of spring 72 moving the inner wall 104 of the slider 66 and split nut 54 out of engagement. Now the piston 62 will be urged into full engagement with the upper split nut half 54a moving the split nut halves 54a and 54b towards each other against the bias of the compression springs 58. At this time the split nut threads 68a and 68b will be brought into full, compressive engagement with the ballscrew threads 37. As noted the ballscrew 20 and the lower ball nut half 54b will be urged towards each other to bring the ballscrew threads 37 into full compressive engagement with the split nut threads 68b on the lower split nut half 54b. This will be accomplished by the further relative travel "dd" shown in FIG. 8. Now the drive gimbal 34 will be fully locked to maintain the stabilizer 12 in a fixed position.

It can be seen that the locked condition as shown is fully maintained by the actuation of the piston 62 by the continued bias applied by the spring 60. Thus no external forces are required to maintain the locked condition. It can also be seen that the amount of relative movement between the primary, drive gimbal housing 42 and secondary nut housing 56 relative to the fixed ballscrew 20 from d to dd is minimal. Thus only a minimal amount of uncontrolled movement of the stabilizer 12 will trigger the secondary load path section 36 to the locked condition.

As noted the full movement of the locking piston 62 brings the lower arcuate grooved surface 90 into full, mating engagement with the arcuate grooved surface 88 on the upper surface of the upper nut half 54a. These surfaces, as noted are arcuately formed as interlocking grooves such that in the event of torsional force applied to the split nut 54 full surface to surface engagement will be maintained to resist such rotation.

The drawings of FIGS. 7 and 8 depict the condition of failure of the primary load path section 14 by failure of the trunnion segments 48. As noted, another form of failure of the primary load path section 14 can be caused by failure of the nut ball members 22. Such a failure is shown in the schematic drawing of FIG. 9.

Figure 9:
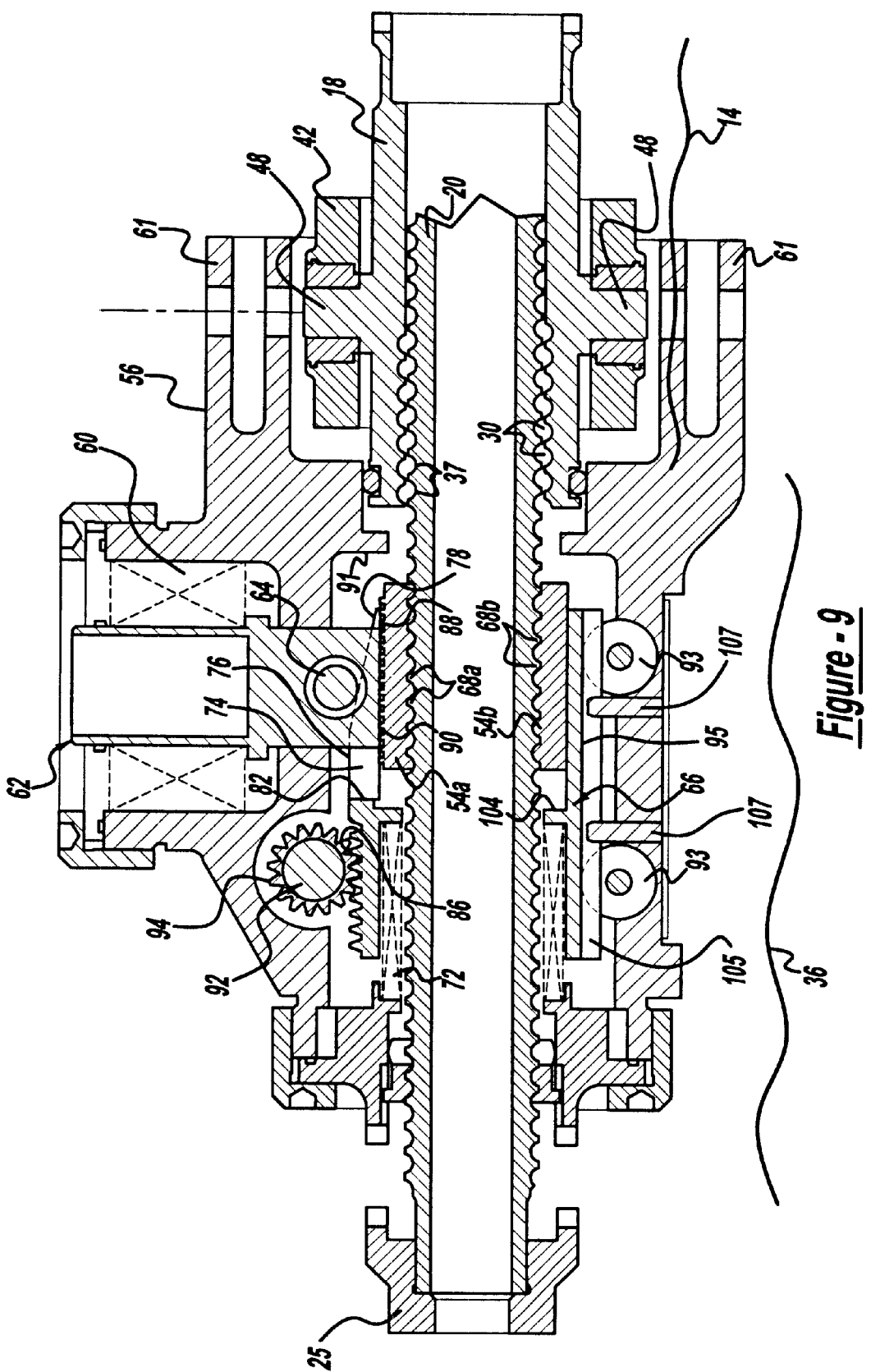
FIG. 9 is a view similar to FIG. 8 depicting the secondary load path section of the stabilizer actuator in its fully triggered condition upon loss of the primary load path section by a failure of the nut ball members of the ball nut in the primary load path section and being moved to its fully locked condition immobilizing the stabilizer actuator.

FIG. 9 depicts the condition of the secondary nut assembly 38 with the secondary load path section 36 and thus drive gimbal 34 in the locked condition, similar to that of FIG. 8, upon failure of the primary load path section 14 caused by failure in the structure of the nut ball members 22. There it can be seen that ballscrew threads 37 are no longer in line with the housing grooves 30 in the ball nut housing 18. Any load imposed in the upward direction of Arrow A on the primary gimbal housing 42 will be transferred by the secondary annular gimbal rings 55 to the secondary gimbal ring housing 57 and hence into the secondary nut housing 56. This again will result in relative axial movement between the primary gimbal housing 42 and secondary nut housing 56 relative to the fixed ballscrew 20. Such relative movement will trigger the actuation of the secondary load path section 36 to the locked condition with the split nut half threads 68a and 68b of the split nut halves 54a and 54b in full locking engagement with the ballscrew threads 37.

The in-situ inspection of the spring energized split nut 54 is provided by a rack and pinion gear assembly 92, which can be externally, manually actuated with a simple drive wrench without the need for any disassembly. This is shown in FIG. 10. The rack and pinion gear assembly 92 includes a pinion gear 94 which is adapted to engage the rack 86 located on the upper surface of the slider 66. The pinion gear 94 is manually rotated, using a hand-held wrench, from the "SET" position (which can be marked on the housing) through a small angle of 20 degrees or less to the "TRIGGERED" position (which can also be marked on the housing) and this causes the slider 66 to translate axially away from the piston 62. The translation of the slider 66 then allows the piston 62 to move radially inwardly with the grooved lower surface 90 engaging the grooved upper surface 88 on the upper nut half 54a of the split nut 54 and move the upper and lower nut halves 54a and 54b into locking engagement with the ballscrew 20. The operator or tester can then attempt to actuate the stabilizer actuator 10 by the internal stabilizer control system to verify that it is permanently immobilized by the split nut 54. Following the inspection, the secondary nut assembly 38 is reset by rotating the pinion gear 94 back to the "SET" position. This repositions the slider 66, lifting the locking piston 62 away from the upper nut half 54a of the split nut 54 whereby the upper and lower nut halves 54a and 54b of the split nut 54 will be returned by the springs 58 to their positions out of locking engagement with the ballscrew 20 and the slider 66 will again be biased by spring 72 to its normal, deactuated position. Only a moderate torque is required to be applied to the pinion gear 94 to reset the secondary nut assembly 38 to the unlocked or set condition.

It should be noted that during actuation of the secondary load path section 36 to the locked condition the rack 86 on the slider 66 will be moved relative to the pinion gear 94 to rotate the pinion gear 94. Thus the engagement of the teeth of the pinion gear 94 with those of the rack 86 is with minimal compressive engagement and the pinion gear 94 itself is rotatably supported on a low friction bearing such that the movement of the rack 86 relative to the pinion gear 94 during actuation of the secondary load path section 36 to a locked condition occurs with minimal resistance.

It can be seen that the secondary load path section 36 will respond to provide the locking action in the event of failure in the primary load path section 14 by failure of the primary ball nut assembly 16, failure of the trunnion structure 48 connection of the nut housing 18 to the primary drive gimbal housing 42 and the failure of the connection of the primary drive gimbal housing 42 to the stabilizer 12 via the connecting arms 40 with the support rod assemblies 44. This is provided by the use of separate housings and connections in the secondary load path section 36 and primary load path section 14 which, as noted, also facilitates alignment of the various interconnected components.

The description of the invention is merely exemplary in nature and, thus, variations that do not depart from the gist of the invention are intended to be within the scope of the invention For example, in some cases it may be advantageous to reverse the stabilizer actuator 10 with the upper support gimbal 26 and motor and gear assembly 24 connected to the lower end of the ballscrew 20. Such variations are not to be regarded as a departure from the spirit and scope of the invention.

What is claimed is:

1. In a winged aircraft having an axially extending fuselage and having a stabilizer with forward and rearward ends supported on the fuselage for pivotal movement about an axis transverse to the axis of the fuselage, the stabilizer being pivotally connected at a pivot point on the transverse axis, a stabilizer actuator connected to the stabilizer and adapted to be actuated by an operator with a control unit at a remote location for controlling the pivotal movement of the stabilizer about the transverse axis to selected positions to assist control of the aircraft in flight, said stabilizer actuator comprising:

a drive gimbal having a drive gimbal housing pivotally connected to the stabilizer, a nut housing connected to said drive gimbal housing by a trunnion structure and having a threaded ball nut section, an elongated ballscrew extending axially through said nut housing and threadably connected to said threaded ball nut section by a plurality of nut ball members, a support gimbal pivotally supported on the fuselage at an axially fixed position generally transverse to the stabilizer and substantially in line with said drive gimbal, a rotary drive structure secured to said support gimbal in said axially fixed position and being rotatably connected to one end of said ballscrew and being selectively actuable by the operator at the remote location for rotating said ballscrew in opposite directions, said ballscrew being secured to said rotary drive structure in said axially fixed position and being rotatable in one direction for threadably moving said nut housing in one axial direction for pivoting the forward end of the stabilizer in a first axial direction and rotatable in the opposite direction for threadably moving said nut housing in an opposite axial direction for pivoting the forward end of the stabilizer in a second opposite axial direction, said drive gimbal, said nut housing, said ballscrew, said nut ball members and said support gimbal defining a primary load path controllable by the operator from the remote location for selectively pivoting the stabilizer, a connecting gimbal having a connecting gimbal housing connected to the forward end of the stabilizer at substantially the same location as said drive gimbal, a main housing connected to said connecting gimbal housing with said ballscrew extending through said main housing, a secondary nut assembly supported in said main housing, said secondary nut assembly including a slide member slideably supported in said main housing and a split nut comprising a pair of split nut halves resiliently separated in a position for engagement with the threads of said ballscrew, pressure means connected to said main housing and operatively connected to said slide member and resiliently held in a position on said slide member out of engagement with said split nut and adapted to move into engagement with said split nut to move said split nut halves into locking engagement with said ballscrew, said connecting gimbal housing, said rotary drive structure, said ballscrew, said main housing, said slide member, said split nut and said pressure means comprising a secondary load path with said slide member adapted to be moved in response to uncontrolled movement of the stabilizer caused by failure of said primary load path with said pressure means engaging said split nut to move it into locking engagement with said ballscrew and with said ballscrew held from rotation in said axially fixed position whereby the stabilizer will be held from pivotal movement in a fixed position.

2. The stabilizer actuator of claim 1 with said slide member adapted to be moved in response to uncontrolled movement of the stabilizer caused by failure of said trunion structure whereby said pressure means will be activated to engage said split nut to move it into locking engagement with said ballscrew.

3. The stabilizer actuator of claim 1 with said slide member adapted to be moved in response to uncontrolled movement of the stabilizer caused by failure of said threaded ball nut section whereby said pressure means will be activated to engage said split nut to move it into locking engagement with said ballscrew.

4. The stabilize actuator of claim 1 with said slide member adapted to be moved in response to uncontrolled movement of the stabilizer caused by failure of the connection of said drive gimbal to the stabilizer whereby said pressure means will be activated to engage said split nut to move it into locking engagement with said ballscrew.

5. The stabilizer actuator of claim 1 with said slide member adapted to be moved in response to uncontrolled movement of the stabilizer caused by failure of said trunion structure, said threaded ball nut section or said drive gimbal whereby said pressure means will be activated to engage said split nut to move it into locking engagement with said ballscrew.

6. The stabilizer actuator of claim 1 with the stabilizer held from pivotal movement in a fixed position by the connection of the stabilizer with said connecting gimbal housing, the connection of said connecting gimbal with said main housing, the connection of said secondary nut assembly and said pressure means with said main housing and the connection of said ballscrew to said rotary drive structure in said axially fixed position whereby the locking engagement of said split nut into said ballscrew will hold the stabilizer in a fixed position.

7. The stabilizer actuator of claim 1 with said locking engagement of said split nut with said ballscrew preventing actuation of said ballscrew by the operator with the control unit from the remote location.

8. The stabilizer actuator of claim 1 with said slide member having a set position for maintaining said pressure means out of engagement with said split nut and a triggered position for actuating said pressure means into engagement with said split nut and including a manually actuable structure connected to said slide member for selective operation for in-situ ground testing by moving said slide member from said set position to said triggered position for actuating said pressure means into engagement with said split nut to move said split nut halves into locking engagement with said ballscrew.

9. The stabilizer actuator of claim 8 with said manually actuable structure including a gear rack on said slide member and a gear engageable with said gear rack whereby rotation of said gear in one direction will move said slide member axially from said set position to said triggered position and rotation in the opposite direction will move said slide member axially from said triggered position to said set position, said gear being externally accessible for manual actuation.

10. The stabilizer actuator of claim 1 with said slide member having a set position for maintaining said pressure means out of engagement with said split nut and a triggered position for actuating said pressure means into engagement with said split nut and including a manually actuable structure connected to said slide member for selective operation for in-situ ground testing by moving said slide member from said set position to said triggered position actuating said pressure means into engagement with said split nut to move said split nut halves into locking engagement with said ballscrew, said manually actuable structure being selectively operable for moving said slide member from said triggered position to said set position deactuating said pressure means from engagement with said split nut with said split nut halves moving out of locking engagement with said ballscrew.

11. The stabilizer actuator of claim 1 with said slide member having a set position for maintaining said pressure means on said slide member out of engagement with said split nut and a triggered position for actuating said pressure means into engagement with said split nut, said slide member being resiliently biased to said set position with said pressure means resiliently held out of engagement with said split nut, said split nut halves having nut threads of a form for mating engagement with the threads of said ballscrew, said nut threads partially overlapping the threads of said ballscrew for partial non-clamping engagement with the threads of said ballscrew, said secondary nut assembly adapted to be moved axially by the stabilizer relative to said ballscrew upon uncontrolled movement of the stabilizer caused by failure of said primary load path whereby the threads of said ballscrew will be moved into axial engagement with said nut threads whereby said split nut will be moved axially into engagement with said slide member at said set position with a predetermined force, the axial engagement of said split nut with said slide member at said predetermined force being sufficient to overcome the resilient bias on said slide member at said set position to move said slide member axially to a said triggered position actuating said pressure means into engagement with said split nut to move said nut threads of said split nut halves into locking engagement with the threads of said ballscrew whereby the stabilizer will be held fixed from pivotal movement.

12. The stabilizer actuator of claim 11 with the partially overlapping location of said nut threads with the threads of said ball screw providing alignment for full locking engagement of said nut threads upon actuation of said spit nut by said pressure means.

13. In a winged aircraft having an axially extending fuselage and having a stabilizer with forward and rearward ends supported on the fuselage for pivotal movement about an axis transverse to the axis of the fuselage, the stabilizer being pivotally connected at a pivot point on the transverse axis, a stabilizer actuator connected to the stabilizer and adapted to be actuated by an operator with a control unit at a remote location for controlling the pivotal movement of the stabilizer about the transverse axis to selected positions to assist control of the aircraft in flight, said stabilizer actuator comprising:

a drive gimbal having a drive gimbal housing pivotally connected to the stabilizer, a nut housing connected to said drive gimbal housing by a trunnion structure and having a threaded nut section, an elongated screw member extending axially through said nut housing and threadably connected to said threaded nut section, a support gimbal pivotally supported on the fuselage at an axially fixed position transverse to the stabilizer and substantially in line with said drive gimbal, a rotary drive structure secured to said support gimbal in said axially fixed position and being rotatably connected to one end of said screw member and being selectively actuable by the operator at the remote location for rotating said screw member in opposite directions, said screw member being secured to said rotary drive structure in said axially fixed position and being rotatable in one direction for threadably moving said nut housing in one direction for pivoting the forward end of the stabilizer in a first direction and rotatable in the opposite direction for threadably moving said nut housing in the opposite direction for pivoting the forward end of the stabilizer in a second direction, said drive gimbal, said nut housing, said screw member and said support gimbal defining a primary load path controllable by the operator for selectively pivoting the stabilizer, a connecting gimbal having a connecting gimbal housing connected to the stabilizer at substantially the same location as said drive gimbal, a main housing connected to said connecting gimbal housing with said screw member extending through said main housing, a secondary nut assembly supported in said main housing, said secondary nut assembly including a force actuating member movably supported in said main housing and a split nut comprising a pair of split nut halves resiliently separated in a position for engagement with the threads of said screw member, pressure means connected to said main housing and operatively connected to said force actuating member and normally held in a position out of engagement with said split nut and adapted to move into engagement with said split nut to move said split nut halves into locking engagement with said screw member, said connecting gimbal housing, said rotary drive structure, said screw member, said main housing, said force actuating member, said split nut and said pressure means comprising a secondary load path with said force actuating member adapted to be moved in response to uncontrolled movement of the stabilizer caused by failure of said primary load path with said pressure means engaging said split nut to move it into locking engagement with said screw member and with said screw member held from rotation in said axially fixed position whereby the stabilizer will be held from pivotal movement in a fixed position.

14. The stabilizer actuator of claim 13 with said force actuating member adapted to be moved in response to uncontrolled movement of the stabilizer caused by failure of said trunion structure whereby said pressure means will be activated to engage said split nut to move it into locking engagement with screw member.

15. The stabilizer actuator of claim 13 with said force actuating member adapted to be moved in response to uncontrolled movement of the stabilizer caused by failure of said threaded nut section whereby said pressure means will be activated to engage said split nut to move it into locking engagement with said screw member.

16. The stabilize actuator of claim 13 with said force actuating member adapted to be moved in response to uncontrolled movement of the stabilizer caused by failure of the connection of said drive gimbal to the stabilizer whereby said pressure means will be activated to engage said split nut to move it into locking engagement with said ballscrew.

17. The stabilizer actuator of claim 13 with said force actuating member adapted to be moved in response to uncontrolled movement of the stabilizer caused by failure of said trunion structure, said threaded nut section or said drive gimbal whereby said pressure means will be activated to engage said split nut to move it into locking engagement with said screw member.

18. The stabilizer actuator of claim 13 with the stabilizer held from pivotal movement in a fixed position by the connection of the stabilizer with said connecting gimbal housing, the connection of said connecting gimbal with said main housing, the connection of said secondary nut assembly and said pressure means with said main housing and the connection of said screw member to said rotary drive structure in said axially fixed position whereby the locking engagement of said split nut into said screw member will hold the stabilizer in a fixed position.

19. The stabilizer actuator of claim 13 with said locking engagement of said split nut with said screw member preventing actuation of said ballscrew by the operator with the control unit from the remote location.

20. The stabilizer actuator of claim 13 including a manually actuable structure connected to said force actuating member for selective operation for in-situ ground testing by moving said force actuating member to a position actuating said pressure means into engagement with said split nut to move said split nut halves into locking engagement with said screw member.

21. The stabilizer actuator of claim 20 with said manually acutable structure including a gear rack on said force actuating member and a gear engageable into said gear rack whereby rotation of said gear in one direction will move said force actuating member to said triggered position and rotation in the opposite direction will move said actuating member from said triggered position to a position moving said pressure means out of engagement with said split nut,
   said gear being externally accessible for manual actuation.

22. The stabilizer actuator of claim 13 including a manually actuable structure connected to said force actuating member for selective operation for in-situ ground testing by moving said force actuating member to a triggered position actuating said pressure means into engagement with said split nut to move said split nut halves into locking engagement with said screw member, said manually actuable structure being selectively operable for moving said force actuating member to a set position deactuating said pressure means from engagement with said split nut with said split nut halves moving out of locking engagement with said screw member.

23. In a winged aircraft having an axially extending fuselage and having a stabilizer with forward and rearward ends supported on the fuselage for pivotal movement about an axis transverse to the axis of the fuselage, the stabilizer being pivotally connected at a pivot point on the transverse axis, a stabilizer actuator connected to the stabilizer and adapted to be actuated by an operator with a control unit at a remote location for controlling the pivotal movement of the stabilizer about the transverse axis to selected positions to assist control of the aircraft in flight, said stabilizer actuator comprising:
   a drive gimbal having a drive gimbal housing pivotally connected to the stabilizer,
   a nut housing connected to said drive gimbal housing and having a threaded nut section,
   an elongated screw member extending axially through said nut housing and threadably connected to said threaded nut section,
   a support gimbal pivotally supported on the fuselage at an axially fixed position transverse to the stabilizer and substantially in line with said drive gimbal,
   a rotary drive structure secured to said support gimbal in said axially fixed position and being rotatably connected to one end of said screw member and being selectively actuable by the operator at the remote location for rotating said screw member in opposite directions,
   said screw member being secured to said rotary drive structure in said axially fixed position and being rotatable in one direction for threadably moving said nut housing in one axial direction for pivoting the forward end of the stabilizer in a first axial direction and rotatable in the opposite axial direction for threadably moving said nut housing in the opposite direction for pivoting the forward end of the stabilizer in a second opposite axial direction,
   said drive gimbal, said nut housing, said screw member and said support gimbal defining a primary load path controllable by the operator from the remote location for selectively pivoting the stabilizer,
   a connecting gimbal having a connecting gimbal housing connected to the stabilizer at substantially the same location as said drive gimbal,
   a main housing connected to said connecting gimbal housing with said screw member extending through said main housing,
   locking means supported in said main housing and actuable for locking engagement with said screw member,
   said locking means normally held in a condition out of engagement with said screw member and adapted to be actuated into locking engagement with said screw member,
   said connecting gimbal housing, said rotary drive structure, said screw member, said main housing, and said locking means comprising a secondary load path with said locking means actuated in response to uncontrolled movement of the stabilizer caused by failure of said primary load path to move into locking engagement with said screw member and with said screw member held from rotation in said axially fixed position whereby the stabilizer will be held from pivotal movement in a fixed position.

24. The stabilizer actuator of claim 23 with the locking engagement of said locking means with said screw member preventing actuation of said screw member by the operator from the remote location.

25. The stabilizer of claim 23 including a manually actuable structure connected to said locking means for selective operation for in-situ ground testing by actuating said locking means into locking engagement with said screw member.

26. The stabilizer actuator of claim 23 including a manually actuable structure connected to said locking means for selective operation for in-situ ground testing by actuating said locking means to a triggered position into locking engagement with said screw member, said manually actuable structure being selectively operable for actuating said locking means to a set position out of locking engagement with said screw member.

27. The stabilizer actuator of claim 26 with said manually actuable structure including a gear rack connected to said locking means and a pinion gear engageable with said gear rack whereby rotation of said pinion gear in one direction will actuate said locking means from said set position to said triggered position and rotation in the opposite direction will actuate said locking means from said triggered position to said set position, said pinion gear being externally accessible for manual actuation.

28. The stabilizer actuator of claim 23 with said locking means including a secondary nut assembly supported in said main housing, said secondary nut assembly including a slide member slideabley supported in said main housing and a split nut comprising a pair of split nut halves resiliently separated from said screw member and actuable for locking engagement with the threads of said screw member, said locking means including pressure means operatively connected to said slide member and normally resiliently held in a set position on said slide member, said slide member adapted to be moved out of the set position and into a triggered actuated position in response to uncontrolled movement of the stabilizer caused by failure of said primary load path with said pressure means moving into engagement with said split nut to move it into locking engagement with said screw member and with said screw member thereby held from rotation in said axially fixed position whereby the stabilizer will be held from pivotal movement in a fixed position.

29. In a winged aircraft having an axially extending fuselage with a tail section and a rudder section at its rearward end and having a stabilizer with forward and rearward ends supported at the tail or rudder section for pivotal movement about an axis transverse to the axis of the fuselage, the stabilizer being pivotally connected at a pivot point on the transverse axis, a stabilizer actuator connected to the stabilizer and adapted to be actuated by an operator with a control unit at a remote location for controlling the pivotal movement of the stabilizer about the transverse axis to selected positions to assist control of the aircraft in flight, said stabilizer actuator comprising:

a drive gimbal having a drive gimbal housing pivotally connected to the stabilizer, a nut housing connected to said drive gimbal housing and having a threaded nut section, an elongated screw member extending axially through said nut housing and threadably connected to said threaded nut section, a support gimbal pivotally supported to the tail or rudder section at an axially fixed position transverse to the stabilizer and substantially in line with said drive gimbal, a rotary drive structure secured to said support gimbal in said axially fixed position and being rotatably connected to one end of said screw member and being selectively actuable by the operator at the remote location for rotating said screw member in opposite directions, said screw member being secured to said rotary drive structure in said axially fixed position and being rotatable in one direction for threadably moving said nut housing in one direction for pivoting the forward end of the stabilizer upwardly and rotatable in the opposite direction for threadably moving said nut housing downwardly for pivoting the forward end of the stabilizer downwardly, said drive gimbal, said nut housing, said screw member and said support gimbal defining a primary load path controllable by the operator from the remote location for selectively pivoting the stabilizer, a connecting gimbal having a connecting gimbal housing connected to the stabilizer at substantially the same location as said drive gimbal, a main housing connected to said connecting gimbal housing with said screw member extending through said main housing, a secondary nut assembly supported in said main housing, said secondary nut assembly including a slide member slideably supported in said main housing and a split nut comprising a pair of split nut halves resiliently separated in a position for engagement with the threads of said screw member, a piston assembly connected to said main housing and operatively connected to said slide member and including a piston resiliently held in a position on said slide member out of engagement with said split nut and adapted to move into engagement with said split nut to move said split nut halves into locking engagement with said screw member, said slide member having an actuating structure with said actuating structure having a set segment and a triggering segment, said piston normally resiliently held on said set segment out of engagement with said split nut and adapted to move into engagement with said split nut when said slide member is moved to bring said triggering segment into engagement with said piston whereby said split nut halves will be moved into locking engagement with said screw member, said connecting gimbal housing, said rotary drive structure, said screw member, said main housing, said slide member, said split nut and said piston assembly comprising a secondary load path with said slide member adapted to be moved in response to uncontrolled movement of the stabilizer caused by failure of said primary load path with said piston engaging said split nut to move it into locking engagement with said screw member and with said screw member held from rotation in said axially fixed position whereby the stabilizer will be held from pivotal movement in a fixed position.

30. The stabilizer actuator of claim 29 with said set segment being a generally flat surface with said triggering segment being angulated towards said split nut whereby movement of said piston onto the angulated surface of said triggering segment will bring said piston into engagement with said split nut to bring it into locking engagement with said screw member.

31. The stabilizer actuator of claim 29 with said set segment being a generally flat surface with said triggering segment being angulated towards said split nut whereby movement of said piston onto the angulated surface of said triggering segment will bring said piston into engagement with said split nut for locking engagement with said split nut, the resilient force on said piston and the inclination of said angulated surface being such that upon engagement of said piston onto said angulated surface the resilient force on said piston as applied to said angulated surface will cam said slide member away from said piston to thereby expedite the descent of said piston further down said angulated surface into full engagement with said split nut to bring it into locking engagement with said screw member.

32. The stabilizer actuator of claim 29 with said slide member being resiliently biased to a first position with said piston resiliently held on said set segment out of engagement with said split nut, said split nut halves having nut threads of a form for mating engagement with the threads of said screw member, said nut threads prior to locking engagement with the threads of said screw member partially overlapping the threads of said screw member in an axially spaced relationship for partial non-clamping engagement with the threads of said screw member, said secondary nut assembly adapted to be moved axially by the stabilizer relative to said screw member upon uncontrolled movement of the stabilizer caused by failure of said primary load path whereby the threads of said screw member will be moved into axial engagement with said nut threads and whereby uncontrolled movement of the stabilizer in one direction will cause said nut member to be engaged with said slide member at said first position with a predetermined force, the axial engagement of said split nut with said slide member at said predetermined force being sufficient to overcome the resilient bias on said slide member at said first position to move said slide member axially to a second position bringing said triggering segment of said slide member into engagement with said piston whereby said piston will engage said split nut to move said nut threads of said split nut halves into locking engagement with the threads of said screw member whereby the stabilizer will be held fixed from pivotal movement.

33. The stabilizer actuator of claim 32 with the partially overlapping location of said nut threads with the threads of said screw member providing alignment for full locking engagement of said nut threads upon actuation of said split nut by said piston.

34. The stabilizer actuator of claim 29 with said piston having an engaging surface with a plurality of arcuate grooves and one of said split nut halves having an engageable surface with a plurality of arcuate grooves adapted to be matingly engaged by the arcuate grooves on said engaging surface of said piston when said piston is moved into engagement with said split nut.

35. The stabilizer actuator of claim 29 with said slide member being resiliently biased to a first position with said piston resiliently held on said set segment out of engagement with said split nut, said split nut halves having nut threads of a form for mating engagement with the threads of said screw member, said nut threads prior to locking engagement with the threads of said screw member partially overlapping the threads of said screw member in an axially spaced relationship for partial non-clamping engagement with the threads of said screw member, said secondary nut assembly adapted to be moved axially by the stabilizer relative to said screw member upon uncontrolled movement of the stabilizer caused by failure of said primary load path whereby said nut threads will be moved into axial engagement with the threads of said screw member and whereby uncontrolled movement of the stabilizer in one direction will cause said nut member to be engaged with said slide member at said first position with a predetermined force, the axial engagement of said split nut with said slide member at said predetermined force being sufficient to overcome the resilient bias on said slide member at said first position to move said slide member axially to a second position bringing said triggering segment of said slide member into engagement with said piston whereby said piston will engage said split nut to move said nut threads of said split nut halves into locking engagement with the threads of said screw member whereby the stabilizer will be held fixed from pivotal movement, uncontrolled movement of the stabilizer in the direction opposite from the one direction prior to movement in the one direction will cause said nut member and said slide member to be moved apart with said nut member engaging a stop structure for subsequent response to oscillatory movement of the stabilizer in the one direction for locking action.

36. In a winged aircraft having an axially extending fuselage with a tail section and a rudder section at its rearward end and having a stabilizer with forward and rearward ends supported at the tail or rudder section for pivotal movement about an axis transverse to the axis of the fuselage, the stabilizer being pivotally connected at a pivot point on the transverse axis, a stabilizer actuator connected to the stabilizer and adapted to be actuated by an operator with a control unit at a remote location for controlling the pivotal movement of the stabilizer about the transverse axis to selected positions to assist control of the aircraft in flight, said stabilizer actuator comprising:

a drive gimbal having a drive gimbal housing pivotally connected to the stabilizer, a nut housing connected to said drive gimbal housing by a trunnion structure and having a threaded ball nut section, an elongated ballscrew extending axially through said nut housing and threadably connected to said threaded ball nut section by a plurality of nut ball members, a support gimbal pivotally supported to the tail or rudder section at an axially fixed position transverse to the stabilizer and substantially in line with said drive gimbal, a rotary drive structure secured to said support gimbal in said axially fixed position and being rotatably connected to one end of said ballscrew and being selectively actuable by the operator at the remote location for rotating said ballscrew in opposite directions, said ballscrew being secured to said rotary drive structure in said axially fixed position and being rotatable in one direction for threadably moving said nut housing upwardly for pivoting the forward end of the stabilizer upwardly and rotatable in the opposite direction for threadably moving said nut housing downwardly for pivoting the forward end of the stabilizer downwardly, said drive gimbal, said nut housing, said ballscrew, said nut ball members and said support gimbal defining a primary load path controllable by the operator from the remote location for selectively pivoting the stabilizer, a connecting gimbal having a connecting gimbal housing connected to the forward end of the stabilizer at substantially the same location as said drive gimbal, a main housing connected to said connecting gimbal housing with said ballscrew extending through said main housing, a secondary nut assembly supported in said main housing, said secondary nut assembly including a slide member slideably supported in said main housing and a split nut comprising a pair of split nut halves resiliently separated in a position for engagement with the threads of said ballscrew, pressure means connected to said main housing and operatively connected to said slide member and resiliently held in a position on said slide member out of engagement with said split nut and adapted to move into engagement with said split nut to move said split nut halves into locking engagement with said ballscrew, said connecting gimbal housing, said rotary drive structure, said ballscrew, said main housing, said slide member, said split nut and said pressure means comprising a secondary load path with said slide member adapted to be moved in response to uncontrolled movement of the stabilizer caused by failure of said primary load path with said pressure means engaging said split nut to move it into locking engagement with said ballscrew and with said ballscrew held from rotation in said axially fixed position whereby the stabilizer will be held from pivotal movement in a fixed position, the connection of the stabilizer with said connecting gimbal housing, the connection of said connecting gimbal with said main housing, the connection of said secondary nut assembly and said pressure means with said main housing and the connection of said ballscrew to said rotary drive structure in said axially fixed position being such that the locking engagement of said split nut into said ballscrew will hold the stabilizer in a fixed position, said slide member having a set position for maintaining said pressure means on said slide member out of engagement with said split nut and a triggered position for actuating said pressure means into engagement with said split nut, said slide member being resiliently biased to said set position with said pressure means resiliently held out of engagement with said split nut, said split nut halves having nut threads of a form for mating engagement with the threads of said ballscrew, said nut threads partially overlapping the threads of said ballscrew for partial non-clamping engagement with the threads of said ballscrew, said secondary nut assembly adapted to be moved axially by the stabilizer relative to said ballscrew upon uncontrolled movement of the stabilizer caused by failure of said primary load path whereby the threads of said ballscrew will be moved into axial engagement with said nut threads whereby said split nut will be moved axially into engagement with said slide member at said set position with a predetermined force, the axial engagement of said split nut with said slide member at said predetermined force being sufficient to overcome the resilient bias on said slide member at said set position to move said slide member axially to said triggered position actuating said pressure means into engagement with said split nut to move said nut threads of said split nut halves into locking engagement with the threads of said ballscrew whereby the stabilizer will be held fixed from pivotal movement.

37. The stabilizer actuator of claim 36 with said slide member adapted to be moved in response to uncontrolled movement of the stabilizer caused by failure of said trunion section, said threaded ball nut section or said drive gimbal whereby said pressure means will be activated to engage said split nut to move it into locking engagement with said ballscrew.

38. The stabilizer actuator of claim 36 with said locking engagement of said split nut with said ballscrew preventing actuation of said ballscrew by the operator with the control unit from the remote location.

39. The stabilizer actuator of claim 36 including a manually actuable structure connected to said slide member for selective operation for in-situ ground testing by moving said slide member from said set position to said triggered position actuating said pressure means into engagement with said split nut to move said split nut halves into locking engagement with said ballscrew, said manually actuable structure being selectively operable for moving said slide member from said triggered position to said set position deactuating said pressure means from engagement with said split nut with said split nut halves moving out of locking engagement with said ballscrew.

40. The stabilizer actuator of claim 39 with said manually actuable structure including a gear rack on said slide member and a gear engageable with said gear rack whereby rotation of said gear in one direction will move said slide member axially from said set position to said triggered position and rotation in the opposite direction will move said slide member axially from said triggered position to said set position, said gear being externally accessible for manual actuation.

41. In a winged aircraft having an axially extending fuselage with a tail section and a rudder section at its rearward end and having a stabilizer with forward and rearward ends supported at the tail or rudder section for pivotal movement about an axis transverse to the axis of the fuselage, the stabilizer being pivotally connected at a pivot point on the transverse axis, a stabilizer actuator connected to the stabilizer and adapted to be actuated by an operator with a control unit at a remote location for controlling the pivotal movement of the stabilizer about the transverse axis to selected positions to assist control of the aircraft in flight, said stabilizer actuator comprising:

a drive gimbal having a drive gimbal housing pivotally connected to the stabilizer, a nut housing connected to said drive gimbal housing and having a threaded nut section, an elongated screw member extending axially through said nut housing and threadably connected to said threaded nut section, a support gimbal pivotally supported to the tail or rudder section at an axially fixed position transverse to the stabilizer and substantially in line with said drive gimbal, a rotary drive structure secured to said support gimbal in said axially fixed position and being rotatably connected to one end of said screw member and being selectively actuable by the operator at the remote location for rotating said screw member in opposite directions, said screw member being secured to said rotary drive structure in said axially fixed position and being rotatable in one direction for threadably moving said nut housing in one direction for pivoting the forward end of the stabilizer upwardly and rotatable in the opposite direction for threadably moving said nut housing downwardly for pivoting the forward end of the stabilizer downwardly, said drive gimbal, said nut housing, said screw member and said support gimbal defining a primary load path controllable by the operator from the remote location for selectively pivoting the stabilizer, a connecting gimbal having a connecting gimbal housing connected to the stabilizer at substantially the same location as said drive gimbal, a main housing connected to said connecting gimbal housing with said screw member extending through said main housing, a secondary nut assembly supported in said main housing, said secondary nut assembly including a slide member slideably supported in said main housing and a split nut comprising a pair of split nut halves resiliently separated in a position for engagement with the treads of said screw member, a piston assembly connected to said main housing and operatively connected to said slide member and including a piston resiliently held in a position on said slide member out of engagement with said split nut and adapted to move into engagement with said split nut to move said split nut halves into locking engagement with said screw member, said slide member having an actuating structure with said actuating structure having a set segment and a triggering segment, said piston normally resiliently held on said set segment out of engagement with said split nut and adapted to move into engagement with said split nut when said slide member is moved to bring said triggering segment into engagement with said piston whereby said split nut halves will be moved into locking engagement with said screw member, said connecting gimbal housing, said rotary drive structure, said screw member, said main housing, said slide member, said split nut and said piston assembly comprising a secondary load path with said slide member adapted to be moved in response to uncontrolled movement of the stabilizer caused by failure of said primary load path with said piston engaging said split nut to move it into locking engagement with said screw member and with said screw member held from rotation in said axially fixed position whereby the stabilizer will be held from pivotal movement in a fixed position, said set segment being a generally flat surface with said triggering segment being angulated towards said split nut whereby movement of said piston onto the angulated surface of said triggering segment will bring said piston into engagement with said split nut for locking engagement with said split nut, the resilient force on said piston and the inclination of said angulated surface being such that upon engagement of said piston onto said angulated surface the resilient force on said piston as applied to said angulated surface will cam said slide member away from said piston to thereby expedite the descent of said piston further down said angulated surface into full engagement with said split nut to bring it into locking engagement with said screw member, said split nut halves having nut threads of a form for mating engagement with the threads of said screw member, said nut threads prior to locking engagement with the threads of said screw member partially overlapping the threads of said screw member in an axially spaced relationship for partial non-clamping engagement with the threads of said screw member, said secondary nut assembly adapted to be moved axially by the stabilizer relative to said screw member upon uncontrolled movement of the stabilizer caused by failure of said primary load path whereby said nut threads will be moved into axial engagement with the threads of said screw member and whereby uncontrolled movement of the stabilizer in one direction will cause said nut member to be engaged with said slide member at said first position with a predetermined force, the axial engagement of said split nut with said slide member at said predetermined force being sufficient to overcome the resilient bias on said slide member at said first position to move said slide member axially to a second position bringing said triggering segment of said slide member into engagement with said piston whereby said piston will engage said split nut to move said nut threads of said split nut halves into locking engagement with the threads of said screw member whereby the stabilizer will be held fixed from pivotal movement.

42. The stabilizer actuator of claim 41 with the partially overlapping location of said nut threads with the threads of said screw member providing alignment for full locking engagement of said nut threads upon actuation of said split nut by said piston.

* * * * *